(12) United States Patent
Coombs et al.

(10) Patent No.: US 12,179,520 B2
(45) Date of Patent: Dec. 31, 2024

(54) SYSTEM AND METHOD FOR TIRE LEAK DETECTION

(71) Applicant: AKTV8 LLC, Wixom, MI (US)

(72) Inventors: Joshua Coombs, Wixom, MI (US);
Bradley Kubiak, Wixom, MI (US);
Gary Meyers, Wlxom, MI (US)

(73) Assignee: AKTV8 LLC, Wixom, MI (US)

( * ) Notice: Subject to any disclaimer, the term of this patent is extended or adjusted under 35 U.S.C. 154(b) by 431 days.

(21) Appl. No.: 17/723,020

(22) Filed: Apr. 18, 2022

(65) Prior Publication Data
US 2022/0234397 A1    Jul. 28, 2022

Related U.S. Application Data

(63) Continuation-in-part of application No. 16/745,084, filed on Jan. 16, 2020, now Pat. No. 11,305,593, (Continued)

(51) Int. Cl.
*B60C 23/00* (2006.01)
*F02B 33/00* (2006.01)
(Continued)

(52) U.S. Cl.
CPC .. *B60C 23/00372* (2020.05); *B60C 23/00318* (2020.05); *B60C 23/00336* (2020.05); *B60C 23/00354* (2020.05); *B60C 23/00363* (2020.05); *F02B 33/00* (2013.01); *F02M 35/10222* (2013.01); *F02M 35/10229* (2013.01); *F02M 35/1038* (2013.01); *F16K 17/26* (2013.01); *B60C 23/001* (2013.01); *F16K 15/207* (2013.01)

(58) Field of Classification Search
CPC ........ B60C 23/00372; B60C 23/00363; B60C 23/00354; B60C 23/00318; B60C 23/00336; B60C 23/001; B60C 23/003; B60C 23/02; B60C 23/04; F16K 17/26
See application file for complete search history.

(56) References Cited

U.S. PATENT DOCUMENTS

| | | | | |
|---|---|---|---|---|
| 4,860,579 A | * | 8/1989 | Beverly | ............ B60C 23/00354 |
| | | | | 152/416 |
| 5,309,969 A | * | 5/1994 | Mittal | ............... B60C 23/00354 |
| | | | | 137/224.5 |

(Continued)

FOREIGN PATENT DOCUMENTS

EP    0343990 A2  *  11/1989

*Primary Examiner* — Kip T Kotter
(74) *Attorney, Agent, or Firm* — Dickinson Wright PLLC

(57) ABSTRACT

A method for detecting a leak in a pressure vessel of a system including a plurality of pressure vessels in fluid communication with a common header comprises: reducing a fluid pressure in the common header to a first predetermined value below an operating pressure of the plurality of pressure vessels; gradually adding fluid to the common header at a first flow rate to increase the fluid pressure in the common header from the first predetermined value; monitoring, after gradually adding the fluid to the common header, the fluid pressure in the common header; and determining, based on the fluid pressure in the common header after gradually adding the fluid to the common header, a leak in at least one pressure vessel of the plurality of pressure vessels.

20 Claims, 23 Drawing Sheets

Related U.S. Application Data which is a continuation of application No. 16/398,596, filed on Apr. 30, 2019, now Pat. No. 10,688,836, which is a continuation of application No. 15/805,015, filed on Nov. 6, 2017, now Pat. No. 10,315,469.

(51) Int. Cl.
*F02M 35/10* (2006.01)
*F16K 17/26* (2006.01)
*F16K 15/20* (2006.01)

(56) References Cited

U.S. PATENT DOCUMENTS

| | | | |
|---|---|---|---|
| 6,561,017 B1 * | 5/2003 | Claussen | B60C 23/00318 73/146 |
| 6,666,078 B1 * | 12/2003 | Claussen | B60C 23/00318 73/146 |
| 6,758,088 B2 * | 7/2004 | Claussen | B60C 23/00372 73/146 |
| 7,273,082 B2 * | 9/2007 | White | B60C 23/00372 152/417 |
| 9,694,630 B2 * | 7/2017 | Kona | B60C 29/02 |

* cited by examiner

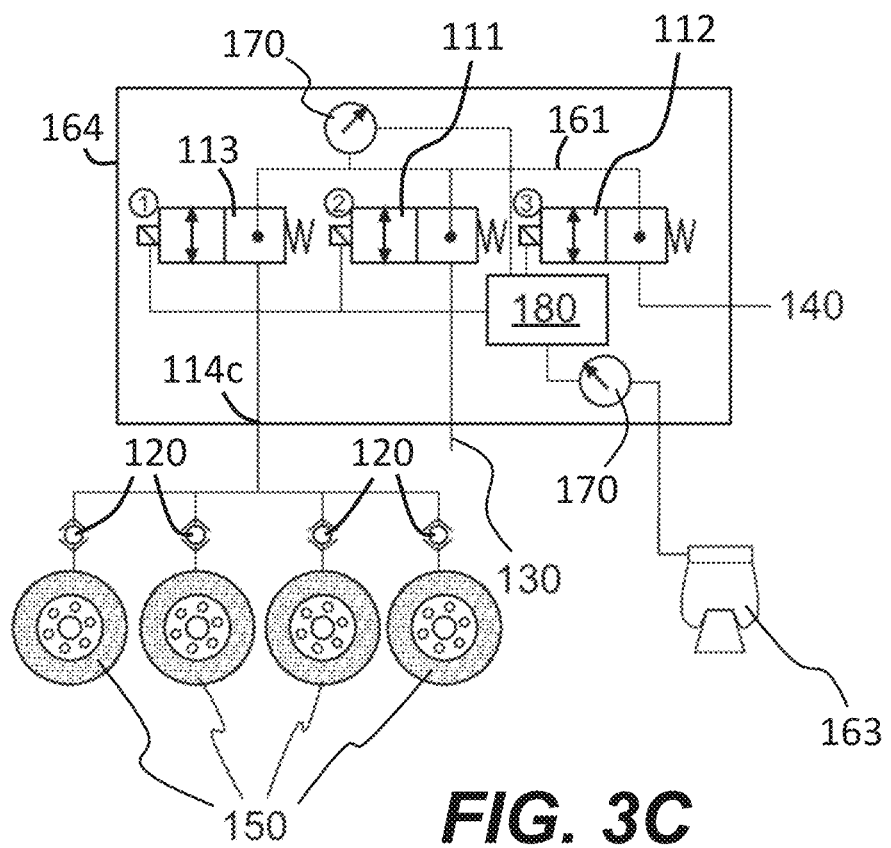
FIG. 3C
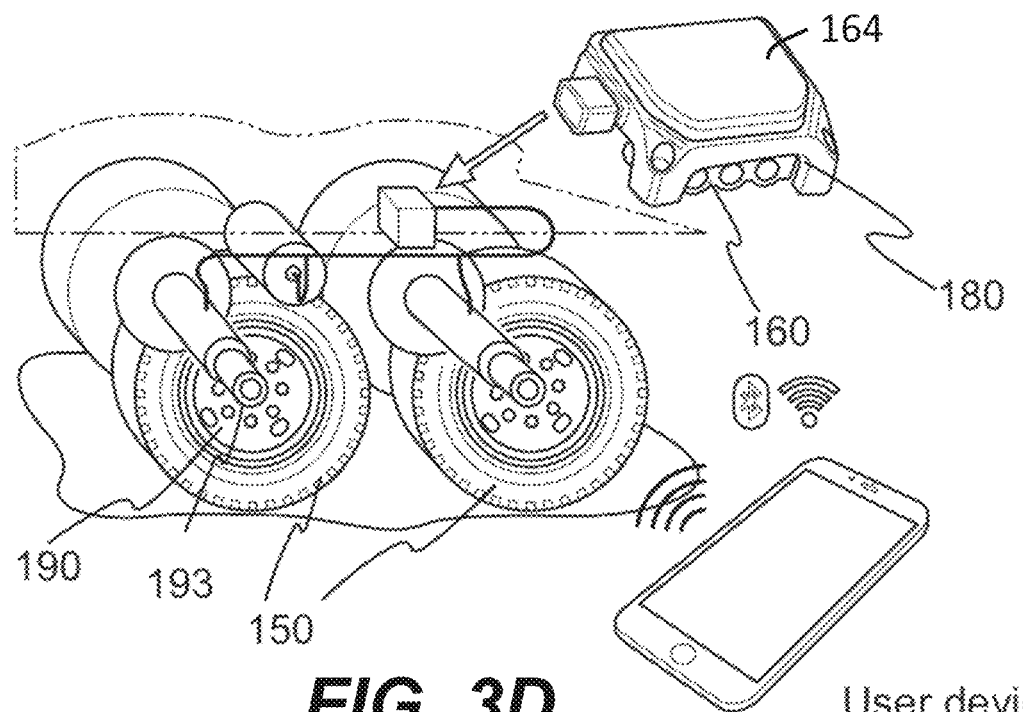
FIG. 3D    User device

SYSTEM AND METHOD FOR TIRE LEAK DETECTION

CROSS REFERENCE TO RELATED APPLICATIONS

This application is a continuation-in-part of U.S. application Ser. No. 16/745,084 filed Jan. 16, 2020 which is a continuation of U.S. application Ser. No. 16/398,596, filed Apr. 30, 2019 and granted as U.S. Pat. No. 10,688,836, which is a continuation of U.S. Nonprovisional application Ser. No. 15/805,015, filed Nov. 6, 2017, and granted as U.S. Pat. No. 10,315,469, which claims the benefit of U.S. Provisional Application Nos. 62/383,919, filed Sep. 6, 2016 and 62/384,652, filed Sep. 7, 2016, all of which are incorporated in their entireties by this reference.

FIELD

The present disclosure relates generally to managing fluid pressures and to detecting leaks in a pressurized fluid system.

BACKGROUND

A problem with conventional central tire inflation systems can arise if one or more of the tires has a leak, and air can flow from the other, non-leaking tires, pressurizing the system, and thereby masking the leak. This can occur with both normally-open and normally-closed wheel-end check valves (WECVs).

SUMMARY

The present disclosure provides a method for detecting a leak in a pressure vessel of a system including a plurality of pressure vessels in fluid communication with a common header. The method comprises: reducing a fluid pressure in the common header to a first predetermined value below an operating pressure of the plurality of pressure vessels; gradually adding fluid to the common header at a first flow rate to increase the fluid pressure in the common header from the first predetermined value; monitoring, after gradually adding the fluid to the common header, the fluid pressure in the common header; and determining, based on the fluid pressure in the common header after gradually adding the fluid to the common header, a leak in at least one pressure vessel of the plurality of pressure vessels.

The present disclosure also provides a system for managing pressure in a plurality of tires of a vehicle. The system comprises: a manifold defining a channel and configured to distribute compressed air from a compressed air source; a common header providing fluid communication between the manifold and each of the plurality of tires; a control valve configured to control air flow from the compressed air source to the common header; a pressure sensor configured to monitor a pressure in the common header; and an electronic control unit in functional communication with the control valve and the pressure sensor. The electronic control unit is configured to: reduce a fluid pressure in the common header to a first predetermined value below an operating pressure of the plurality of tires; gradually add air to the common header to increase the fluid pressure in the common header from the first predetermined value; monitor, after gradually adding the fluid to the common header, the fluid pressure in the common header; and determine, based on the fluid pressure in the common header after gradually adding the air to the common header, a leak in at least one of the plurality of tires.

BRIEF DESCRIPTION OF THE DRAWINGS

Further details, features and advantages of designs of the invention result from the following description of embodiment examples in reference to the associated drawings.

FIGS. 3A-3D show schematic diagrams of the tire management system integrated with a manifold of a vehicle.

DETAILED DESCRIPTION

Figure 1:
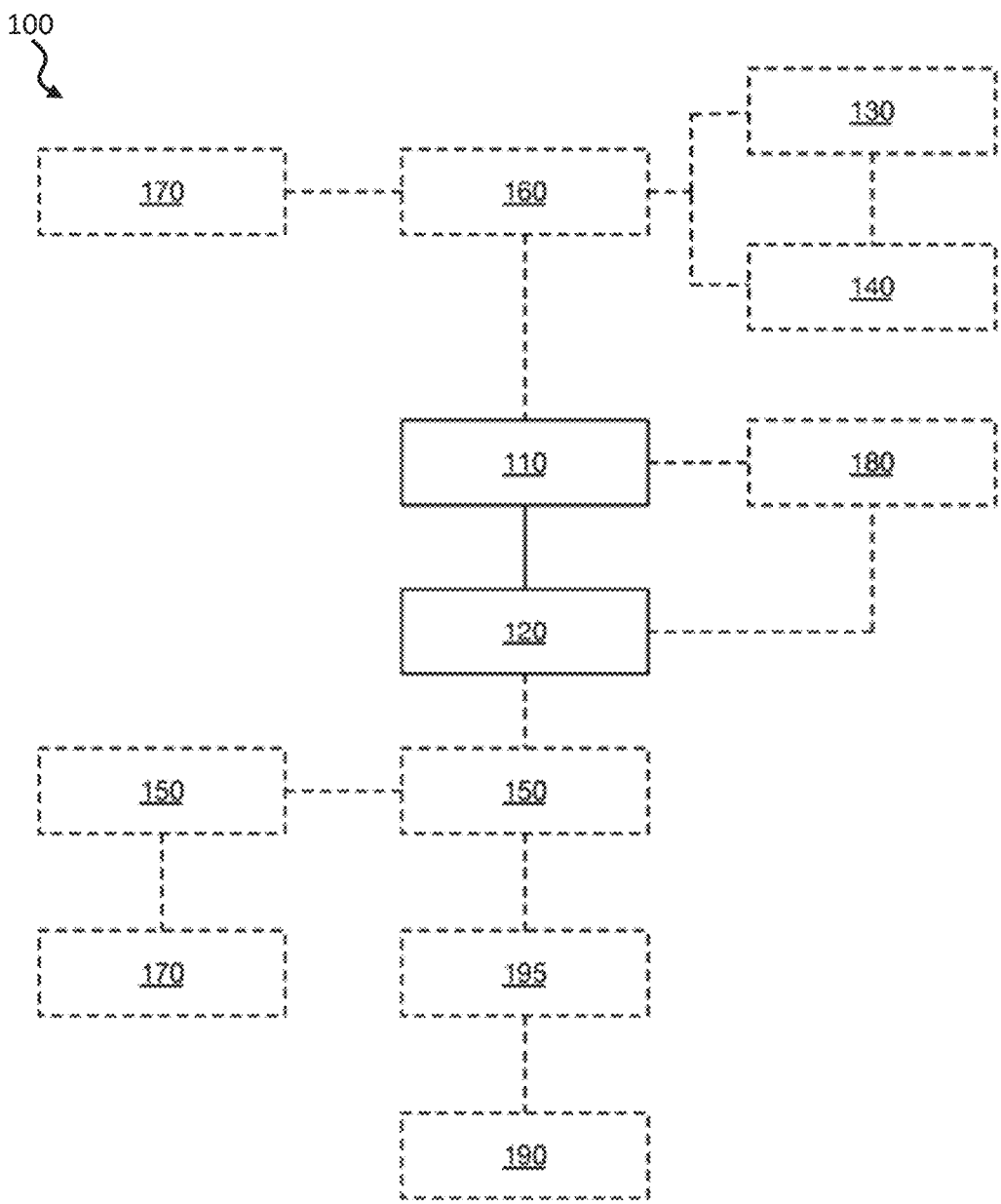
FIG. 1 shows a schematic representation of an embodiment of a tire management system.

Referring to the drawings, the present invention will be described in detail in view of following embodiments. The following description is not intended to limit the invention to these preferred embodiments, but rather to enable any person skilled in the art to make and use this invention

1. Overview

The tire management system (TMS) can include one or more control valves 110 and a check valve 120, and can optionally include an air source 130 and an air sink 140. The TMS functions to provide an on-vehicle tire inflation system that automatically fluidly isolates a tire 150 from the inflation system (e.g., air source 130) in the event of a system leak, but still allows controlled tire deflation during typical use. The TMS can further automatically fluidly isolate the tire 150 from the remainder of the fluid circuit (e.g., from other tires connected to the same fluid circuit) in the event of tire leak, but still allow controlled tire inflation during typical use.

The method of TMS operation includes: determining a pressure parameter value S200, determining an operational parameter for a valve based on the pressure parameter value S210, and controlling the valve based on the operational parameter S220. The method functions to selectively control the TMS system to avoid triggering automatic tire fluid isolation during selective tire deflation and/or inflation.

Variants of the tire management system (TMS) and method confer several benefits over conventional tire pressure management systems and methods. First, in some variants, the check valve seals closed at a system leak (e.g. when the vehicle is in a 'key-off' state), isolating the system from the tire. These variants can confer the benefit of preventing tire deflation when the vehicle is parked, which further aligns with regulations regarding minimum required inflation amounts of a tire. Second, in some variants, the system deflates a tire to a target tire pressure through dithering of the control valve. These variants can confer the benefit of controllably deflating a tire without activating a check valve seal. Additionally, some variants confer the benefits of both the first and second variant, which are traditionally at odds due to the risk of sealing a check valve during traditional deflation (non-dithered), which could be dangerous to the driver as well as require intervention at the tire to unseal the check valve. Fourth, in some variants, the check valve is bidirectional. This can confer the benefit of isolating the system from the tire in the case of a system leak as well as isolating the tire from the system in the case of a tire leak (e.g. tire blowout). Fifth, in some variants, the check valve is passive and/or the control valve is non-proportional, both of which can confer the benefit of a relatively low cost of manufacture of the system.

2. System.

As shown in FIG. 1, the TMS 100 includes a control valve 110 and a check valve 120. The TMS 100 can additionally include an air source 130, an air sink 140, a tire 150, a manifold 160, a pressure sensor 170, a controller 180, a vehicle condition database 185, and/or a mounting mechanism 190. Additionally or alternatively, the TMS 100 can include any other suitable components. Each TMS can be connected to one or more tires 150 through the same or different manifold in parallel, in series, or a combination thereof. Each vehicle can include one or more TMS' 100, wherein multiple TMS' can be connected to the same or different tires. Multiple TMSs can optionally share components (e.g., control units), data (e.g., transferred from a first TMS to a second TMS), or any other suitable element.

2.1 Air System.

The system can further include any or all of an air system, wherein the air system includes the following air system elements: an air source 130, an air sink 140, and a tire 150. However, the air system can include any other suitable component.

2.2 Air Source.

The air source 130 functions to provide compressed air to a tire in a vehicle (e.g. a truck). Preferably, the compressed air is only provided to a tire when the compressed air in the air source is at a higher pressure than the air in the tire. Alternatively, the compressed air can be provided to the tire at any time. Additionally or alternatively, the air source 130 can function to provide compressed air to other elements in the system or vehicle (e.g. to the braking system, suspension system, etc.). Preferably, the air source 130 is fluidly connected to a tire, wherein the air source 130 transmits compressed air to the tire during tire inflation. Alternatively, the air source 130 can be fluidly connected to a pair of tires, all the tires in a vehicle, or any number or combination of tires. Preferably, the air source 130 is also fluidly connected to a compressor, wherein the air source 130 receives compressed air from the compressor. Additionally or alternatively, the air source 130 can include a compressor and/or be fluidly connected to ambient air or any other air source. Further alternatively, the air source can be fluidly connected or otherwise connected to any other component of the vehicle, an external pump, a conduit inside or outside the vehicle (e.g. hose), or any other suitable component. Preferably, the air source 130 is a reservoir of compressed air (e.g. a compressed air tank). Alternatively, the air source 130 is a reservoir of compressed fluid, a compressor, a pump, or other suitable device. Preferably, there is a single air source 130 in the TMS 100 system. Alternatively, there can be one air source 130 per tire in the vehicle, one air source 130 among multiple vehicles, or any other arrangement of the air source(s) 130. Preferably, the air source 130 contains compressed air at all times of vehicle operation. Alternatively, the air source 130 can operate between one or more modes. In one variation, the modes are binary, wherein the air source 130 contains compressed air in one mode (e.g. when the vehicle is in a 'key-on' state) and contains air at atmospheric pressure in another mode (e.g. when the vehicle is in a 'key-off' state). In another variation, there can be any number of operational modes for the air source 130.

2.3 Air Sink.

The system can further include an air sink 140, which functions to remove air from a tire in a vehicle. Preferably, air is only removed from a tire when the air in the tire is at a higher pressure than air in the air sink 140. Alternatively, air can be transmitted from the tire to the air sink 140 at any time. Additionally or alternatively, the air sink 140 can function to remove air from other elements in the system or vehicle (e.g. from the engine). Preferably, the air sink 140 is fluidly connected to a tire, wherein air flows from the tire to the air sink 140 during tire deflation. Alternatively, the air sink 140 can be fluidly connected to a pair of tires, a set of tires, or any number or combination of tires. Preferably, the air sink 140 is or is fluidly connected to the ambient environment of the vehicle. Alternatively, the air sink 140 can be fluidly connected or otherwise connected to a filter, a reservoir/tank, a conduit inside or outside the vehicle (e.g. hose), another component of the vehicle, or any other suitable component or environment. Preferably, the air sink 140 is a conduit (e.g. hose). Alternatively, the air sink 140 is a valve, or any other suitable outlet. Preferably, there is a single air sink 140 in the TMS 100 system. Alternatively, there can be one air sink 140 per tire in the vehicle, one air sink 140 among multiple vehicles, or any other arrangement of the air sink 140(s). Preferably, the air sink 140 permits air transmission at all times of vehicle operation. Alternatively, the air sink 140 can operate between one or more modes. The modes can be binary, wherein the air is open in one mode (e.g. when the vehicle is in a 'key-on' state) and is closed in another mode (e.g. when the vehicle is in a 'key-off' state). Alternatively, there can be any number of operational modes for the air source. In one example, the air sink 140 is configured to permit a specified rate of air flow depending on a tire pressure parameter (e.g. pressure value).

2.4 Tire.

The system can further include a tire 150, wherein the tire 150 is attached to the vehicle and functions to provide traction between the vehicle and the terrain over which the vehicle travels. Additionally or alternatively, the tire 150 can function to absorb shock transferred to the vehicle from the terrain, support the load of the vehicle, and/or determine the direction of vehicle travel. Preferably, the tire 150 is attached to the vehicle and fluidly connected to both an air source and an air sink. Alternatively, the tire 150 can be fluidly connected to one of an air source and an air sink, or neither an air source nor an air sink. In one variation, the tire 150 is fluidly connected to both an air source and an air sink with a single conduit. In another variation, the tire 150 is fluidly connected to an air source with a conduit and to an air sink with a separate conduit. In one example, the conduit is an axle 168 (e.g. a pressurized axle) in a vehicle. In another example, the conduit is a hose assembly (e.g. a pressurized axle tube). Preferably, the tire 150 has a cylindrical shape formed by an external shell configured to retain air. Alternatively, the tire 150 can have a spherical shape or any other suitable shape. Preferably, the external shell is rubber (e.g. synthetic rubber, natural rubber). Alternatively, the external shell can be a fabric overlaid on a wire mesh, a carbon block compound, or any other material. Preferably, the tire 150 has a pattern of grooves (e.g. tread) arranged on all or part of the external shell which makes contact with the ground. In a cylindrical variation of the tire 150, a tread pattern, for example, can be fabricated on the outer wall of the tire 150. Alternatively, a pattern of grooves may be arranged on the entire 150 external shell or on any part of the external shell. In one variation, the system includes four tires 150 per axle 168 of a vehicle. In another variation, the system includes two tires 150 per axle 168 of the vehicle. In other variations, the system includes a single tire 150 or any number of tires 150, arranged in any way with relation to each other and to the vehicle.

Preferably, the tire 150 further comprises a tire valve 151 configured to provide an attachment site with which to fluidly connect the tire 150 to an air source and/or an air sink. Preferably the tire valve is fluidly connected to an air source or an air sink via an intermediary component (e.g. a conduit), wherein the tire valve is attached to one end of the intermediary component (e.g. a threaded tube). Alternatively, the tire valve can be directly attached to an air source and/or an air sink. Preferably, the tire valve is a poppet valve (e.g. Schrader valve). Alternatively, the tire valve can be a check valve, a spool valve, a plug valve, or any other valve. Preferably, the tire valve is configured for two-way air flow, but can alternatively be configured for one-way air flow or any number and arrangement of air flows. Preferably, the tire valve is passive, but can alternatively be actively controlled (e.g. by a control unit). Preferably, each tire 150 has two tire valves but can alternatively have a single tire valve or any number of tire valves.

In one variation, the tire 150 and/or TMS further includes a pressure sensor connected to the tire 150, wherein the pressure sensor is configured to determine a pressure parameter of the tire 150 (e.g. pressure value of air within external shell, pressure rate of flow into/out of tire 150, etc.). In one example, for instance, the pressure sensor is coupled to the tire valve, wherein the value of the pressure parameter measured by the pressure sensor is used, at least in part, to determine the operational mode of the tire valve (e.g. open, closed, open for a specified direction of flow, etc.). In a second example, the pressure sensor is connected to manifold fluidly connected to the tire interior. This manifold can be the fluid manifold fluidly connecting the tire 150 to the air source 130, the air sink 140, and/or to any other suitable endpoint, wherein the tire pressure can be measured by holding the tire valve in an open position, sealing an upstream valve, arranged between the tire and the endpoint, and measuring an interstitial pressure. However, the tire pressure can be otherwise determined.

2.5 Manifold.

The system can further include a manifold 160, which functions to direct fluid flow between air system elements. Preferably, the fluid flow is cooperatively directed by one or more valves (e.g. control valves), but can alternatively be directed independently or by any other suitable component. Additionally or alternatively, the manifold 160 functions to contain (e.g. enclose, mechanically protect) one or more system components (e.g. control valves, check valves). Additionally or alternatively, the manifold 160 can function as a substrate for attachment of system components and/or external components.

In a first variation, variation, the manifold 160 is a set of one or more fluid connections, wherein the fluid connections are configured to fluidly connect an air source and an air sink to a tire. The fluid connections can be flexible, rigid, or have any suitable property. The fluid connections can be hoses, tubes, lumens (e.g., axle lumens), or be otherwise configured. In one example, one hose connects the tire to an air source while another conduit connects the tire to an air sink. In another example, one hose connects the tire to an air source while a second hose connects the tire to an air sink, wherein the first and second hoses are connected with a channel. In one variation in which the TMS is a central tire inflation system, the manifold extends from a central air source (e.g., air reservoir), through or along the axles, to the wheel ends. However, the air can be otherwise routed to the wheel ends.

In a second variation, the manifold 160 is a centralized air routing component that accepts auxiliary fluid connections to route air to the tires. The manifold 160 is preferably made of a thermoplastic (e.g., nylon or polyvinyl toluene with a 30% glass fill), but can alternatively be made of another synthetic or natural polymer, a flexible material (e.g. rubber), metal (e.g., an axle lumen, metal tube, etc.), composite material, or any other suitable material. The manifold 160 is preferably injection molded, but can alternatively be milled out of a single block of material (e.g., metal, plastic), cast out of metal, composed of separate sub-components which are fastened together, or made using any combination of these or other suitable manufacturing techniques.

The manifold 160 may define one or more ports 114*a*, 114*b*, 114*c*, 114*d*, which function to fluidly connect the air system elements. The ports 114*a*, 114*b*, 114*c*, 114*d* can also function to receive an external fitting and/or attachment (e.g. a threaded quick-release compressed-gas fitting, barbed fitting, hose, pressurized axle tube, etc.) that facilitates fluid connection of the port to the air system element. In one variation, each air system element has its own port. In other variations, a single one of the ports 114*a*, 114*b*, 114*c*, 114*d* may be shared among multiple air system elements. In other variations, a single air system element is connected to multiple ports 114*a*, 114*b*, 114*c*, 114*d*. The port preferably defines a straight flow axis, but can alternatively define a curved flow path, a branched flow path (e.g., with at least a third end in addition to the first and second end), or any other suitable path along which air can flow through the port. In variations including a plurality of ports 114*a*, 114*b*, 114*c*, 114*d*, the flow axis of each port 114*a*, 114*b*, 114*c*, 114*d* may be parallel to each of the other flow axes of each of the other ports 114*a*, 114*b*, 114*c*, 114*d*. In one example, the first and second ports 114*a*, 114*b* are arranged with the respective flow axes sharing a common plane (port plane). However, multiple ports can be arranged offset from each other, at a non-zero angle to each other, or be arranged in any other suitable configuration.

The manifold 160 preferably includes a channel 161 (galley) which functions to provide fluid connections between ports, but can be otherwise configured. The channel 161 preferably contains compressed air from the air source that is simultaneously accessible to each of the control valves (e.g., is connected to the control valves in parallel), but can be serially connected to the control valves or otherwise connected. The channel 161 preferably intersects the ports between the respective first and second ends of each port, but can alternatively be connected by a secondary manifold 160 or otherwise connected to one or more ports of the manifold 160. The channel 161 is preferably fluidly connected to every port of the manifold 160, but can alternatively be connected to a first subset of ports and fluidly isolated from a second subset of ports. In one variation, the channel 161 connects one port to a second port. The pressure sensor is preferably fluidly connected to the channel 161 and measures the pressure of whichever downstream element is fluidly connected to the channel 161, but can alternatively be arranged within a port, along a fluid connection, or be otherwise arranged. The channel 161 preferably extends normal the port, but can alternatively extend parallel to or at any other suitable angle to the port. The channel 161 preferably lies in the same plane as the ports, but can alternatively be offset from the port plane (e.g., lie above or below the port plane, extend at an angle to the port plane, etc.). The channel 161 is preferably substantially linear (e.g., define a substantially linear flow axis), but can alternatively be curved (e.g., toward or away from the second end, out from the port plane, etc.) or have any other suitable configuration. However, the channel 161 can be otherwise configured or arranged. The channel 161 is preferably connected to an output of a filter 162, but can alternatively be connected directly to an air element.

In a first embodiment, the manifold 160 is the manifold 160 in the electronically controlled vehicle suspension system in U.S. Provisional Application No. 62/384,652 filed 6 Sep. 2017, which is incorporated in its entirety by this reference. In one example, the manifold 160 includes a first port 114*a* coupled to an air source, a second port 114*b* (e.g., exhaust port) coupled to an air sink, and a third port 114*c* coupled to a tire (e.g. through the tire valve), wherein the three ports 114*a*, 114*b*, 114*c* are fluidly connected through a single channel. The manifold 160 can optionally include a fourth port 114*d* fluidly connected to a suspension system 163 (e.g., air spring). However, any other suitable manifold 160 can be used.

2.6 Control Valve.

The control valves 110 may function to selectively bring a tire 150 into fluid connection with one or more air system elements (e.g. FIGS. 3A-3D). In some embodiments, the control valves 110 each include a two-way valve. Alternatively, one or more of the control valves 110 may include a three-way valve, or can have any number of inlets and outlets in any arrangement. The control valves 110 may be operable between an open position, permitting fluid connection between a tire 150 and an air system element, and a closed position, wherein the control valve 110 prevents fluid connection between a tire 150 and an air system element. The control valves 110 may be normally in (i.e. biased toward) an open position (e.g., they are normally-open valves). Alternatively or additionally, one or more of the control valves 110 can be normally in (biased toward) a closed position (e.g., a normally-closed valve). In some embodiments, one or more of the control valves 110 may be actively controlled (e.g. by a controller). Alternatively or additionally, one or more of the control valves 110 may be passively operable. For example, the control valves 110 may each include an electromechanically operable valve (e.g. a solenoid valve). Alternatively, one or more of the control valves 110 can be operable in any other way. In some embodiments, the control valves 110 each include a non-proportional valve. Alternatively, one or more of the control valves 110 can include a proportional valve, a servo valve, or any other type of valve. In one variation, the control valves 110 each include the actuator as described in U.S. Provisional Application No. 62/384,652 filed 6 Sep. 2017, which is incorporated in its entirety by this reference.

In some embodiments, one or more of the control valves 110 are emplaced in (e.g. arranged in) a flow path (e.g. a port) between a tire 150 and one or more air system elements, and controls fluid flow therethrough. Preferably, the control valve 110 is aligned with the flow path but can alternatively be oriented at an angle with respect to the flow path, located partially or wholly outside the flow path, or otherwise arranged. Preferably the TMS has one control valve 110 per air system element, but can alternatively have any number of control valves 110.

Figure 4:
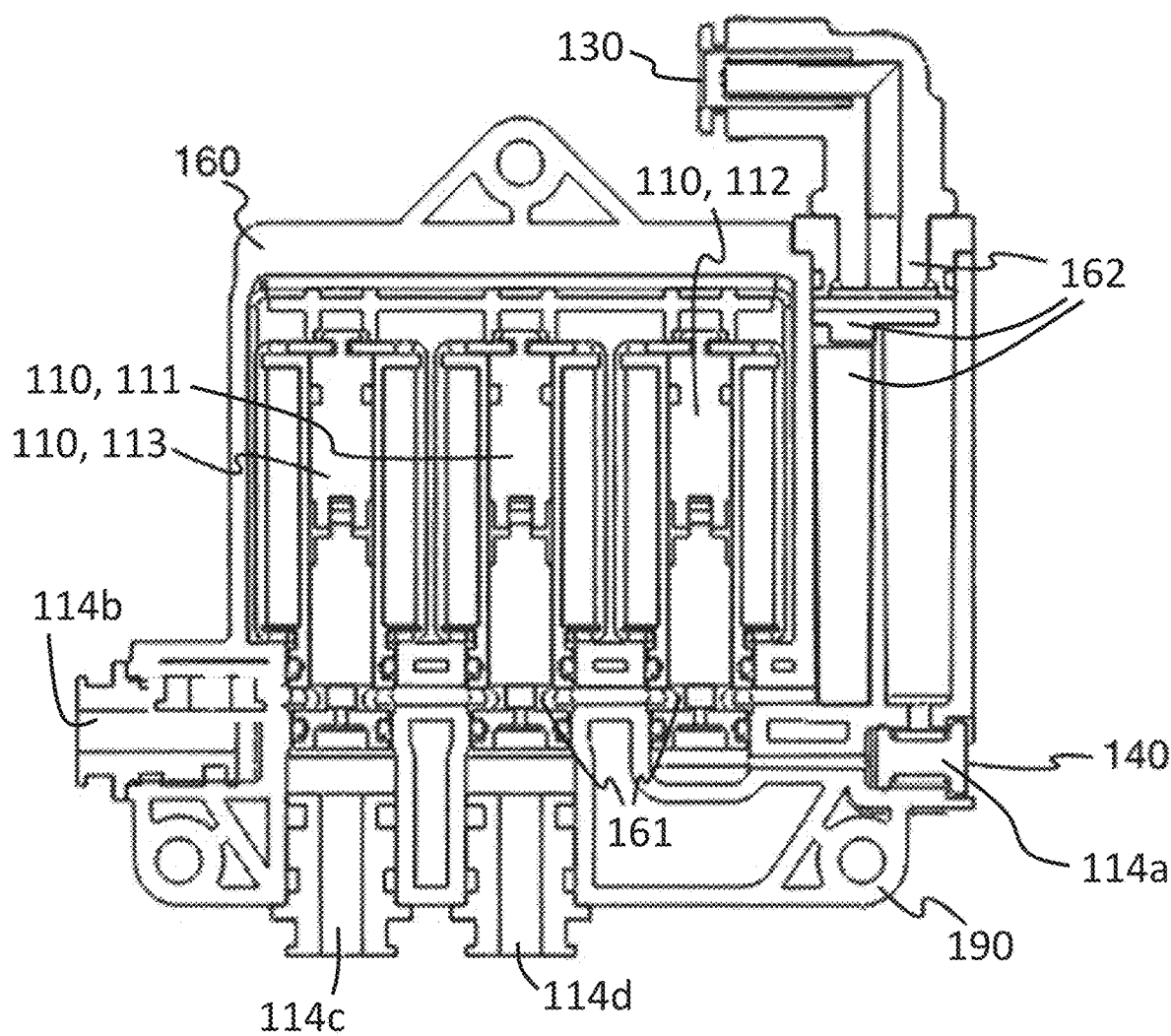
FIG. 4 shows an arrangement of control valves within a manifold of a vehicle.

In one variation, the control valves 110 are arranged in a manifold 160 (e.g. FIG. 4). In a first example, the control valves 110 are arranged in the manifold 160 described in U.S. Provisional Application No. 62/384,652 filed 6 Sep. 2017, which is incorporated in its entirety by this reference, wherein the control valves 110 are arranged in ports, wherein each port is fluidly connected to a channel 161. In another example, the control valves 110 are arranged in a manifold 160 without a channel 161, wherein the fluid connections between air system elements remain separate.

In one variation, wherein the control valves 110 are arranged in the manifold as described in U.S. Provisional Application No. 62/384,652 filed 6 Sep. 2017, which is incorporated in its entirety by this reference, wherein the manifold has a channel 161, there is one control valve 110 per air system element.

Figure 5A:
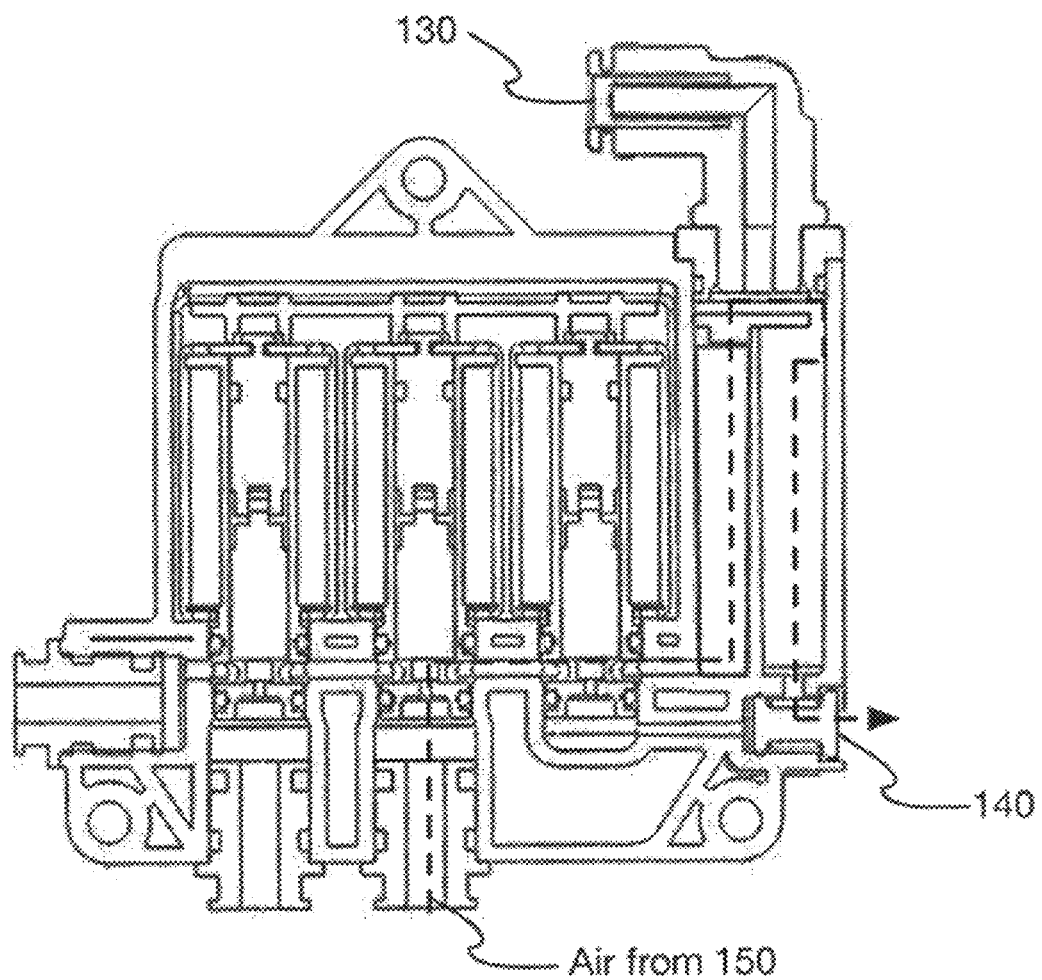
FIGS. 5A and 5B show illustrations of air flow in a vehicle during tire deflation and inflation, respectively.
Figure 5B:
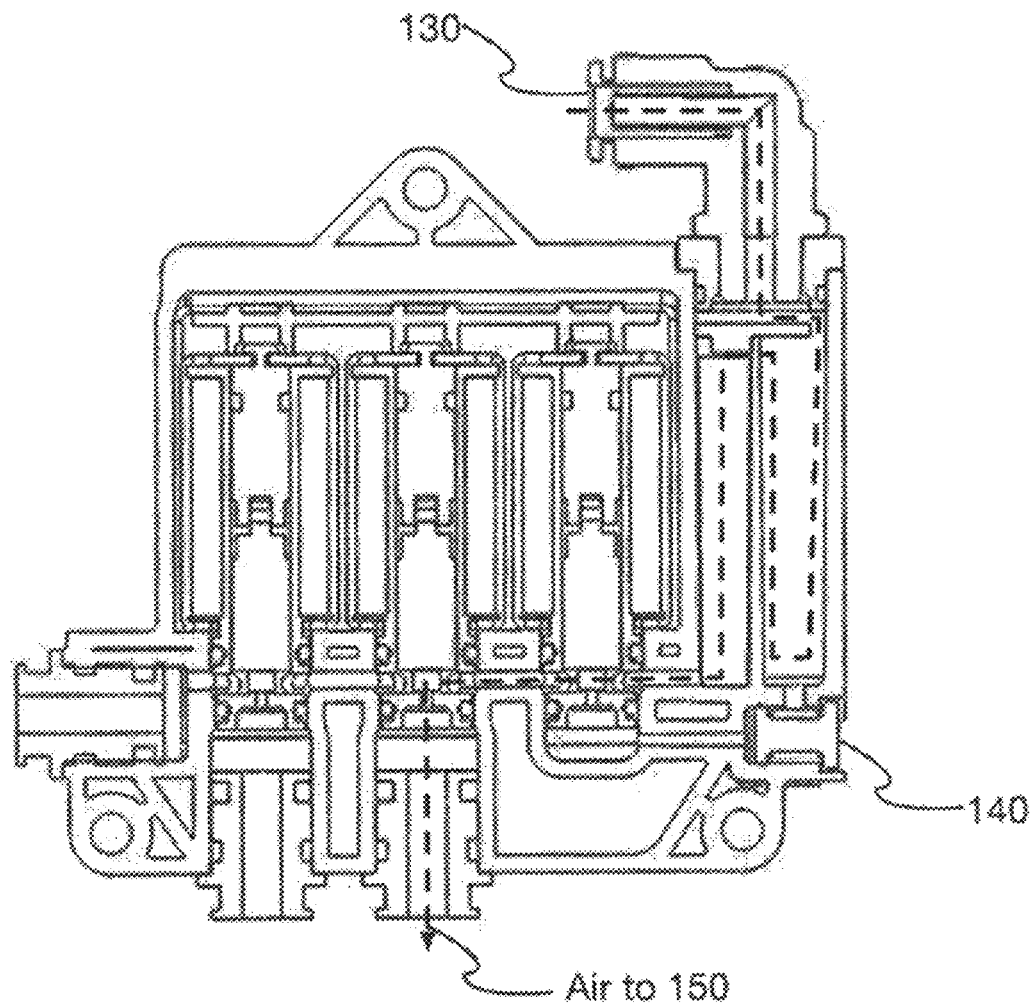

For example, and as shown in FIG. 3C, the control valves 110 include an intake valve 111) which fluidly connects an air source 130 to the channel 161. As also shown in FIG. 3C, the control valves 110 may also include an exhaust valve 112 which fluidly connects an air sink 140 to the channel 161. The exhaust valve 112 can be normally-open, such that the system is exhausted upon key-off. Alternatively, the exhaust valve 112 may be a normally-closed valve. The intake valve 111 can be normally-closed, such that initial system operation does not immediately pressurize the channel 161. Alternatively, the intake valve 111 may be a normally-open valve. The intake valve 111 can selectively control the pressure in a fluidly connected third port 114*c* (connected to the tire 150), and thereby control a tire pressure in one or more tires 150 fluidly connected to the third port 114*c*. As also shown in FIG. 3C, the control valves 110 may also include an output control valve 113 which fluidly connects one or more tires 150 to the channel 161. In this variation, the intake valve 111 and the output control valve 113 can be opened to inflate the tire 150, and the exhaust valve 112 and the output control valve 113 can be opened to deflate the tire 150. By selectively controlling the configurations of these control valves 111, 112, 113, the tire(s) 150 can be in fluid communication with only the air sink 140 (e.g. during deflation), only the air source 130 (e.g. during inflation), both the air sink 140 and the air source 130, or neither the air sink 140 nor the air source 130. An example of a flow path during tire deflation is illustrated in FIG. 5A. An example of a flow path during tire inflation is illustrated in FIG. 5B.

2.7 Pressure Sensor.

The system can further include a pressure sensor 170, which functions to determine a pressure parameter value in the TMS or elsewhere in the vehicle. Preferably, the pressure sensor 170 is a differential pressure sensor 170 but can alternatively be a gauge pressure sensor 170, an absolute pressure sensor 170, a sealed pressure sensor 170, or any other sensor configured to determine a pressure parameter. Preferably, the pressure parameter is a pressure change rate between air system elements. Alternatively, the pressure parameter can be a pressure change rate within an element, a gauge pressure within an element, a difference in gauge pressures between elements, a pressure change acceleration, or any other suitable parameter. The pressure sensor 170 is preferably connected to and configured to measure a pressure parameter in an air system element (e.g. an air source, a tire, an air sink), but can alternatively be configured to measure a pressure parameter in a manifold (e.g. in a channel, port, etc.), between air system elements, or elsewhere. Preferably, the pressure sensor 170 is a piezoelectric material, but may be any other material or combination of materials configured to determine a pressure parameter. Preferably, there is one pressure sensor 170 per air system element, but alternatively there may be a single pressure sensor 170 or any number of pressure sensors 170 in the system.

In one variation, a pressure sensor 170 is arranged in a port of a manifold, wherein the pressure sensor 170 port is fluidly connected to a channel and configured to determine the value of a pressure parameter in the channel 161. In one example, the pressure sensor 170 measures the absolute pressure of the compressed air in the channel 161. In another example, the pressure sensor 170 measures the pressure change rate between an air source and a tire 150. In alternative examples, the pressure sensor 170 can be arranged in any port, channel, or other part of a manifold, wherein the pressure sensor 170 can measure any pressure parameter associated with any air system element or combination of air system elements fluidly connected to said element.

In a second variation, the pressure sensor 170 is arranged within or elsewhere on an air system element. In one embodiment, a pressure sensor 170 is arranged within the external shell of a tire and configured to measure the absolute pressure within the tire. In a second embodiment, a first pressure sensor 170 is arranged within a first air system element (e.g. an air source) and a second pressure sensor 170 is arranged within a second air system element (e.g. a tire), wherein the pressure sensors 170 are each configured to determine a pressure parameter (e.g. absolute pressure), wherein these pressure parameters are further used to determine a secondary pressure parameter (e.g. pressure change rate). In one example, the secondary pressure parameter is determined using a controller.

In some embodiments, and as shown in FIG. 3C, the system includes a pressure control module (PCM) 164. The PCM 164 includes a pressure sensor 170 fluidly connected to and monitoring the pressure within a suspension system 163 (e.g., an air spring). In one example, the pressure sensor 170 is used to determine the load in the vehicle. However, the system can include any suitable number of pressure sensors arranged in any suitable configuration. In some embodiments, the PCM 164 also includes the manifold 160, and one or more control valves 110 in a unitary package.

2.8 Electronic Control Unit.

The system can further include an electronic control unit (ECU) 180, which functions to control the operation of one or more valves. The ECU 180 may include one or more microprocessors and/or microcontrollers. Additionally, the ECU 180 may include communications circuitry, such as CAN, LIN, Ethernet, etc. Additionally, the ECU 180 may include digital and/or analog output circuitry for providing power to operate one or more valves. Additionally or alternatively, the ECU 180 can function to control power provision to one or more valves in the system. Additionally or alternatively, the ECU 180 can function to control the operation of or the power provision to any element or combination of elements in the system or vehicle (e.g. a pressure sensor). In some embodiments, the PCM 164 also includes the ECU 180.

The ECU 180 is preferably electrically connected to and controls the operation (e.g. position) of one or more control valves. The ECU 180 can store a vehicle condition database 185, an error log, or any other suitable information. Alternatively, the ECU 180 can be wirelessly connected to and control the operation of one or more control valves. The ECU 180 is preferably a printed circuit board assembly (PCB), but can alternatively be a wire wrap circuit, a point-to-point soldered electrical circuit, or any other suitable configuration. In one variation, the ECU 180 is configured for wireless communication, and can include short range communication systems (e.g., NFC, Bluetooth, RF, etc.), long-range communication systems (e.g., WiFi, cellular, satellite, etc.), a vehicle networking system (e.g., CAN bus connection), or any other suitable communication system. In one example, the ECU 180 is configured to receive instructions from a driver, a fleet command center, or any other suitable control system.

In one variation, the ECU 180 is configured to communicate with a remote information source (e.g. lookup table, database, server, user device, vehicle network system, etc.), wherein the remote information source communicates commands for the operation of one or more control valves to the ECU 180. In one example, the remote information source communicates a set of commands for the control valves to the ECU 180, wherein the set of commands is determined using vehicle information such as the load (e.g., mass) value and distribution in the vehicle, the terrain conditions (e.g., current and/or anticipated), the location and orientation of the vehicle, and/or any other parameter. In another example, the remote information source is an operator at a fleet command center, wherein the operator communicates instructions to a driver through a display module coupled to the ECU 180.

In one variation, the ECU 180 is an electronics module as described in U.S. Provisional Application No. 62/384,652 filed 6 Sep. 2017, which is incorporated in its entirety by this reference. In a second variation, the ECU 180 is a user device (e.g. mobile phone). In a third variation, the ECU 180 is an existing control unit (e.g. engine control unit) in the vehicle.

2.9 Vehicle Condition Database.

The system can further include a vehicle condition database 185, which functions to store vehicle condition parameters, such as, but not limited to: operational parameters (e.g. operational modes for a control valve or a check valve), pressure parameters, tire condition (e.g. wear-and-tear) parameters, or any other parameter. Additionally or alternatively, the vehicle condition database 185 can function to inform the operation of one or more valves based on the vehicle condition parameters. For example, the vehicle condition database 185 can include a database, table, equation, or other data structure correlating a pressure or pressure rate differential to control valve operating instructions. In a second example, the vehicle condition database 185 includes a data structure (database, equation, lookup table, etc.) correlating the load magnitude and/or distribution with target tire pressures (e.g., for all or a subset of tires). In a third example, vehicle condition database 185 includes a data structure correlating a terrain parameter (e.g., incline, surface roughness, surface looseness, surface wetness, traction, etc.) with target tire pressures (e.g., for all or a subset of tires). However, the vehicle condition database 185 can include any other suitable information.

Preferably, the vehicle condition database 185 is communicatively coupled to a controller of the vehicle, but can additionally or alternatively be communicatively coupled to a user device of an operator of the vehicle (e.g. driver, fleet command center, etc.), or any other suitable device. The set of vehicle condition parameters preferably includes parameters related to the state of the vehicle, such as the load (magnitude, distribution, etc.) on the vehicle, vehicle 'health' (e.g. wear-and-tear, service reports, oil and fuel levels, etc.), and any other information related to the operation of the vehicle. Additionally or alternatively, the set of vehicle condition parameters can include parameters related to the environment of the vehicle along a route, such as, but not limited to: weather conditions (e.g. temperature, precipitation), traffic conditions, terrain conditions (e.g. road incline angle, predicted road friction, etc.), or any other conditions related to the current or proposed environment of a vehicle. Preferably, the vehicle condition database 185 is dynamically updated but can alternatively be updated at one or more discrete times, or contain static, predetermined parameters.

In one variation, the vehicle condition database 185 includes a lookup table, which functions inform the operational parameters of the vehicle. To perform this function, the lookup table correlates operational modes of one or more valves in the vehicle with vehicle condition parameters. Additionally or alternatively, the lookup table can correlate operational modes of other elements of the system or vehicle (e.g. vehicle key-on/off state) with vehicle condition parameters. Preferably, the correlations are determined through one or more algorithms, but can additionally or alternatively be determined through a mathematical model, through a machine learning process, by an operator, or determined in any other suitable way. In one example, the lookup table contains a set of potential arrangements of a load on a vehicle, a target pressure parameter for each tire based on that load, and an operational mode for each valve in the system, wherein the operational mode is determined algorithmically based on the target tire pressure parameters and the current tire pressures parameters.

2.10 Check Valve.

The check valve 120 functions to selectively isolate a tire from fluid connection with one or more air system elements. Preferably, the check valve 120 is fluidly connected to a tire and to a control valve, but can alternatively be fluidly connected just to a tire. Preferably, the check valve 120 is arranged upstream of a tire, but can alternatively be arranged downstream of a tire, within a tire, or otherwise arranged. The check valve 120 is preferably arranged downstream of one or more control valves, but can alternatively be arranged within a control valve, upstream of a control valve, or otherwise arranged. The check valve 120 can be passively controlled (e.g., based on pressure differentials across the valve, pressure rate changes across the valve, etc.), actively controlled by the ECU, or otherwise controlled.

In a first variation, the check valve 120 is a one-way check valve, arranged within the fluid manifold leading to the tire. The check valve 120 can be unidirectional (e.g., permit fluid flow in a single direction), bidirectional (e.g., permit fluid flow in both directions), or otherwise configured. In a first embodiment, the check valve can be an unloader valve that fluidly seals (e.g., upstream, toward the system) in response to the upstream pressure (e.g., system pressure) falling below the downstream pressure (e.g., tire pressure) by a threshold amount, at a rate faster than a predetermined rate, when the downstream pressure substantially matches a target pressure (e.g., a maximum tire pressure), or when any other suitable condition is satisfied. In a second embodiment, the check valve can fluidly seal downstream, toward the tire, in response to the downstream pressure falling below the upstream pressure by a second threshold amount (e.g., equal to, less than, or more than the first threshold amount), at a rate faster than the same or different predetermined rate, or when the same or different condition is satisfied. In a third embodiment, the system can include check valves of both the first and second embodiment in-line within the fluid manifold leading to the tire.

In a second variation, the check valve 120 is a two-way valve, but can alternatively be a three-way valve or have any number of inlet and outlet ports. Preferably, the check valve 120 defines a first combined inlet/outlet port and a second combined inlet/outlet port, wherein the first combined inlet/outlet port is fluidly connected to an upstream air system element (e.g. air source) and the second combined inlet/outlet port is connected to a downstream air system element (e.g. tire). Alternatively, the first combined inlet/outlet port is located downstream of the second combined inlet/outlet port, neither combined inlet/outlet port is located downstream of the other, or they can be arranged in any other suitable way. Preferably, the check valve 120 is a bidirectional valve, wherein the check valve 120 is configured to control flow in two directions, wherein the two directions are preferably arranged opposite to each other but can alternatively be otherwise arranged. Alternatively, the check valve 120 permits fluid connection between a tire and an air system element, and as many sealed configurations as there are directions in which the check valve 120 is configured to seal (e.g. two sealed configurations for a bidirectional valve, one sealed configuration for a unidirectional check valve 120, etc.), wherein each sealed configuration prevents fluid connection in a specified direction between a tire and an air system element. Alternatively, the check valve 120 may be operable in only one or more sealed configurations, only an open configuration, or in any combination of open and sealed configurations.

Figure 7A:
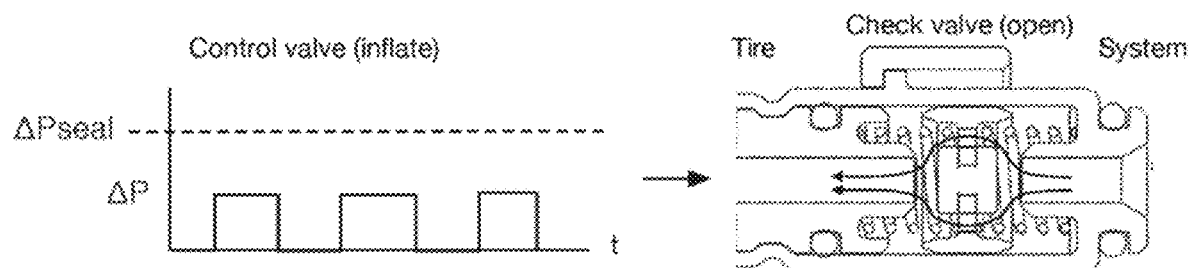
FIGS. 7A-7D show the check valve in various configurations depending on the operation of a control valve.
Figure 7B:
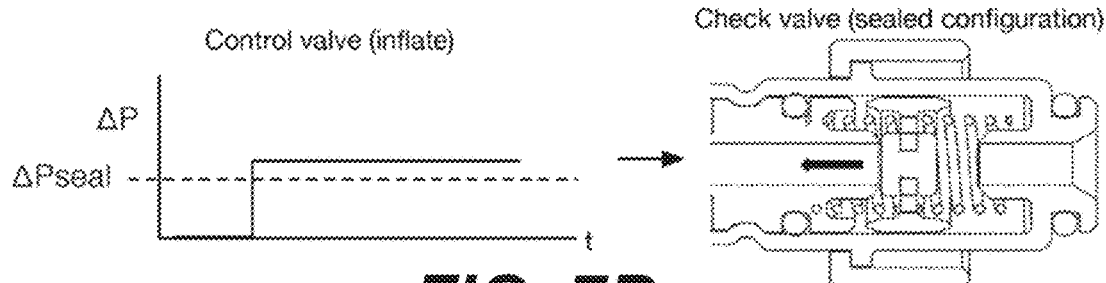
Figure 7C:
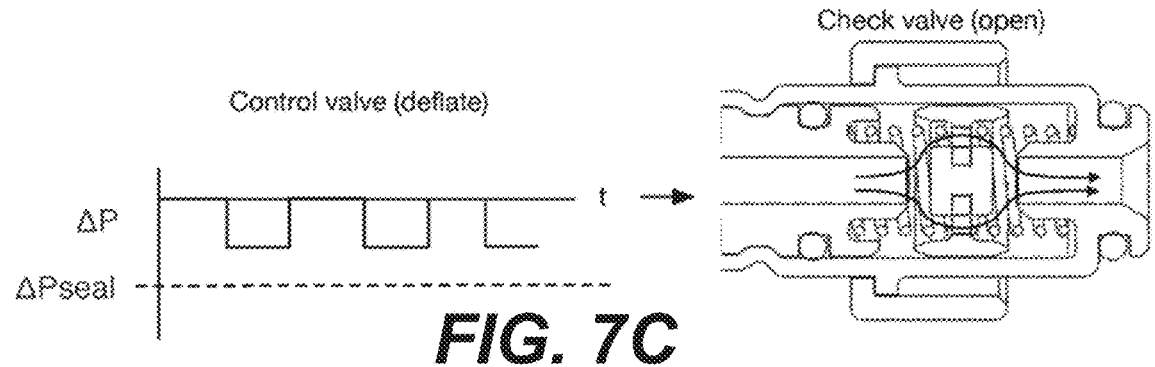
Figure 7D:
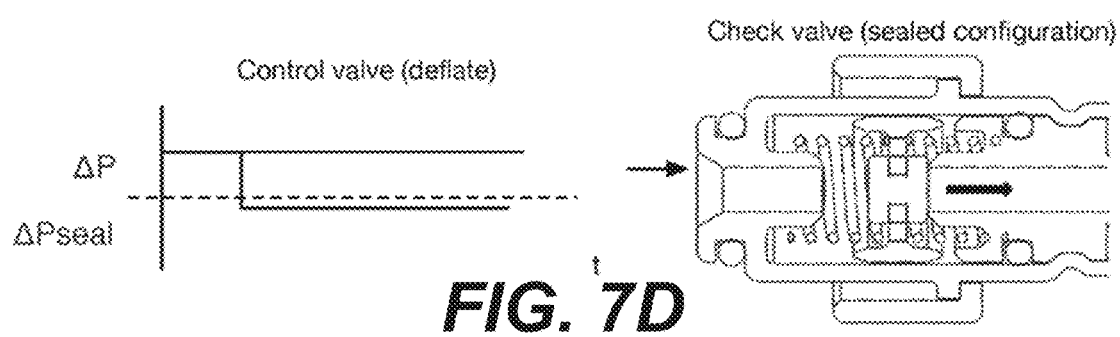

Preferably, the check valve 120 is in a first sealed configuration (e.g. FIG. 7B) when a pressure parameter value associated with a second combined inlet/outlet port exceeds a pressure parameter value associated with a first combined inlet/outlet port by a first predetermined threshold, herein referred to as the first sealing pressure. Alternatively, the check valve 120 is normally in a first sealed configuration, is only in a first sealed configuration for a specified range of pressure parameter values, is never in a first sealed configuration, or is in a first sealed configuration at any other time. Preferably, the check valve 120 is in a second sealed configuration (e.g. FIG. 7D) when a pressure parameter value associated with a first combined inlet/outlet port exceeds a pressure parameter value associated with a second combined inlet/outlet port by a second predetermined threshold, herein referred to as the second sealing pressure. Alternatively, the check valve 120 is normally in a second sealed configuration, is only in a second sealed configuration for a specified range of pressure parameter values, is never in a second sealed configuration, or is in a second sealed configuration at any other time. Preferably, the first and second sealing pressures are equal, but can alternatively be different (e.g., the first higher than the second). In one example, the system enters a sealed configuration when the downstream pressure (e.g., tire pressure) drops below the upstream pressure (e.g., system pressure) beyond a threshold difference or faster than a threshold rate, such as in the case of a tire blowout (e.g. FIG. 7B). In this example, the check valve seals toward the second inlet/outlet port, and functions to isolate the tire from the rest of the system. In another example, the system enters a sealed configuration when the upstream pressure (e.g., system pressure) drops below the downstream pressure (e.g., tire pressure) beyond a threshold difference or faster than a threshold rate, such as when the vehicle is in a key-off state to prevent tire deflation (e.g. FIG. 7D) while the vehicle is parked or when the compressor is turned off. In this example, the check valve seals toward the first inlet/outlet port, and functions to isolate the system from the tire. Preferably, the check valve 120 is in an open configuration (e.g. FIGS. 7A and 7C) when the difference between a pressure parameter value associated with a first combined inlet/outlet port and a pressure parameter value associated with a second combined inlet/outlet port is below both the first and second sealing pressures. Alternatively, the check valve 120 is in an open configuration when the different in pressure parameter values is only below a single sealing pressure, when the difference in pressure parameter values is zero, check valve 120 is normally in a first sealed configuration, when the difference in pressure parameter values is within a specified range, or at any other time. Preferably, the operation of the check valve 120 is passively controlled but can alternatively be actively controlled (e.g. by the ECU 180).

In one variation, the operational mode of the check valve 120 further includes a partially sealed configuration, wherein fluid flow within the valve is partially restricted. In one example, the degree of flow restriction is proportional to the difference in pressure parameter values between valve ports.

Figure 6:
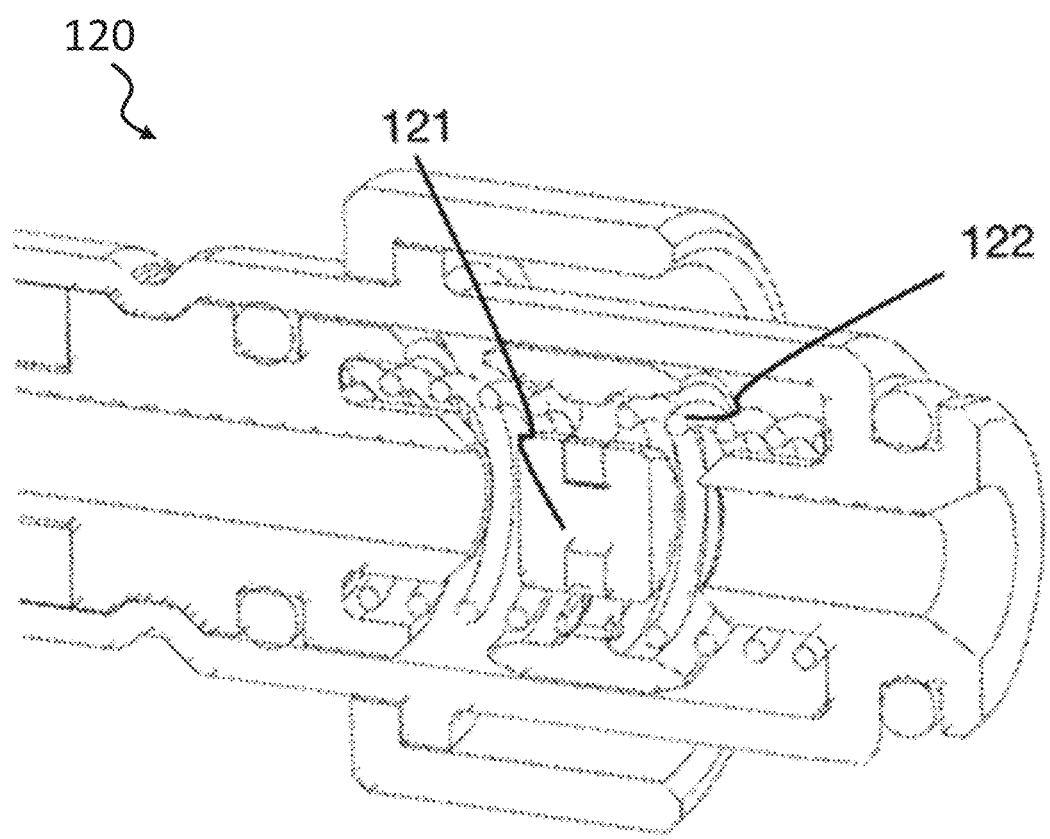
FIG. 6 shows an example embodiment of a check valve.

Preferably, the check valve 120 (e.g. FIG. 6) includes a closing element 121, wherein engagement of the closing element 121 with an inlet/outlet port of the check valve 120 functions to restrict or prevent flow through that inlet or outlet port. Alternatively, the check valve 120 can include no closing element 121, two closing elements 121, or any number of closing elements 121. Preferably, the closing element 121 is a poppet, but can alternatively be a ball, disk, diaphragm, gate, or any other element. Preferably, the closing element 121 is rubber, but can alternatively be metal, plastic, glass, compressed fluid, or any suitable material. The inlets and outlets of the check valve 120 are preferably conically tapered to retain the closing element 121; alternatively, the check valve 120 can have inlets and outlets with uniform cross sections or any other suitable cross section. The check valve 120 preferably further includes a compressive element 122, wherein the compressive element 122 functions to press a closing element 121 against an inlet or an outlet port of the valve in the closed configuration. Alternatively, the check valve 120 can include only closing elements 121. Preferably the compressive element 122 is a spring but can alternatively be a piston, a column of compressed air, or any other suitable element. Preferably each compressive element 122 in the check valve 120 has the same compressive value (e.g. spring constant), but can alternatively have different compressive values. Preferably, all the elements of the check valve 120 are enclosed within a single housing but can alternatively be split among multiple housings or not enclosed in any housing.

Preferably, the check valve 120 is arranged in alignment with a flow axis between a tire and an air system element. Alternatively, the check valve 120 may be arranged with an offset to the flow axis, arranged at an angle with respect to the flow axis, or otherwise arranged.

In one variation, the check valve 120 includes one closing element and two compressive elements. In one example, a first closing element is coupled to the first inlet/outlet port, a second closing element is coupled to the second inlet/outlet port, and the closing element is arranged between the two compressive elements.

In a second variation, the check valve 120 includes two closing elements and two compressive elements. In one example, the closing elements are arranged closest to the check valve 120 inlet/outlet ports with the compressive elements arranged between the closing elements.

In a third variation, the check valve 120 is a set of two or more unidirectional check valves 120. In one example, the unidirectional check valves 120 are arranged in series. In another example, the unidirectional check valves 120 are arranged in parallel.

2.11 Mounting Mechanism.

The system can further include a mounting assembly, wherein the mounting mechanism 190 functions to connect all or part of the system to a vehicle. Additionally or alternatively, the mounting mechanism 190 can function to enclose any or all parts of the system, as well as other elements of a vehicle. The mounting mechanism 190 is preferably attached at a wheel assembly of a vehicle but can alternatively can be attached at any part of the vehicle (e.g. a manifold). The mounting mechanism 190 is preferably attached at the wheel assembly of a vehicle, wherein the wheel assembly includes a hubcap 195 and a tire, but can alternatively be attached elsewhere in or on a vehicle. The mounting mechanism 190 is preferably configured to be retrofittable, wherein the mounting mechanism 190 can be attached to existing attachment sites of the vehicle (e.g. a port on a hubcap 195 of the vehicle), but can alternatively require additional components for attachment, can integrated with the vehicle during manufacture, or integrated in any other suitable way.

The mounting mechanism 190 preferably includes a mounting conduit 196, wherein the mounting conduit 196 functions to fluidly connect the mounting mechanism 190 to the air system of the vehicle. The mounting conduit 196 is preferably connected to an axle of a vehicle (e.g. with a barbed press-in interface), but can alternatively be connected to a hose running through an axle, a conduit outside of an axle, or to any other suitable element. The mounting conduit 196 is preferably a cylindrical shell (e.g. hose, tube), but can alternatively have an obloid cross section, a non-uniform cross section throughout its length, or any other suitable geometry. The mounting conduit 196 is preferably metal, but can alternatively be plastic, rubber, or any other suitable material. There is preferably one mounting conduit 196 per mounting assembly, but can alternatively be one mounting conduit 196 per air system element, one mounting conduit 196 per subset of air system elements, or any number and arrangement of mounting conduits. The mounting conduit 196 is preferably always open but can alternatively be partially open, partially or fully closed, or operate m any number and type of operational modes.

Figure 10:
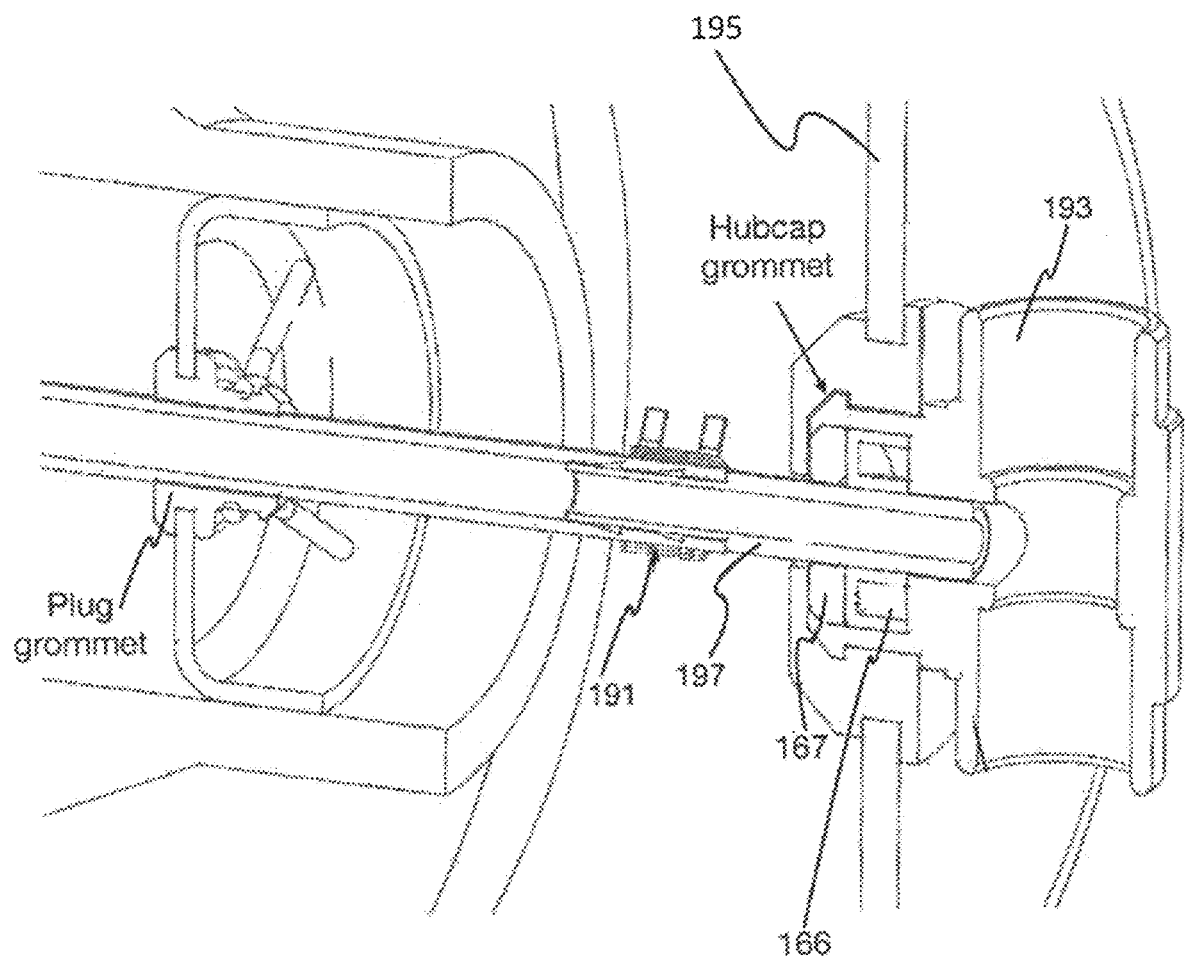
FIG. 10 shows the mounting mechanism attached to a vehicle axle assembly with a barbed press-in interface.

The mounting mechanism 190 can further include an attachment piece 191, which functions to connect the mounting conduit to an axle of the vehicle. Preferably, the attachment piece 191 is configured to prevent relative rotation between the axle and the mounting conduit but can alternatively allow partial or full rotation between the axle and the mounting conduit. In one variation, the attachment piece 191 is a barbed press-in interface with spring clamp retention (e.g. FIG. 10). However, the system can include any other suitable attachment piece 191.

The mounting mechanism 190 can further include a rotational assembly 192, which functions to provide a fluid connection between the mounting mechanism 190 and the tire of a vehicle. Additionally or alternatively, the rotational assembly 192 can function to enclose one or more check valves or other components. The rotational assembly 192 preferably attaches to a tire at one or tire valves (e.g. Schrader valve), but can alternatively be fluidly connected with one or more tires in any suitable way. The rotational assembly 192 preferably connects to the rest of the mounting mechanism 190 at hubcap 195, but can alternatively connect to the rest of the mounting mechanism 190 at any other part of a wheel assembly. The rotational assembly 192 preferably includes a series of conduits 193 arranged perpendicular to the mounting conduit. Alternatively, the rotational assembly conduits 193 can be arranged at an angle with respect to the mounting conduit or in any other suitable arrangement. The rotational assembly 192 is preferably metal, but can alternatively be plastic, rubber, or any other suitable material. Preferably, the rotational assembly 192 is configured to rotate with the wheel assembly but can alternatively be configured to rotate with an offset to the wheel assembly, to not rotate at all, or to rotate in any other way. Preferably, one or more check valves is arranged in each conduit of the rotational assembly 192, wherein the check valves are aligned with the flow axis defined by the conduit. Alternatively, there may be no check valves arranged within a conduit, or the check valves may be aligned at an angle with the conduit.

The rotational assembly 192 can further include a rotary union 194, wherein the rotary union 194 functions to fluidly connect the rotational assembly 192 and the mounting conduit, wherein the rotary union 194 is configured to preserve a fluid connection between two elements having a relative rotation with each other. Preferably, the rotary union 194 is aligned with the flow axis of the mounting mechanism 190 but can alternatively be aligned with a flow axis of the rotational assembly or otherwise arranged. In one example, the rotary union 194 rotates about a stator 197 (e.g., mounting conduit), wherein the stator 197 can remain static relative to the vehicle frame. The stator 197 can terminate before, at, or beyond the bearing plane of the rotary union. The stator 197 is preferably fluidly connected (e.g., along an end, through axial holes, etc.) to the tire conduit (e.g., fluid connection extending between the stator 197 and the tire interior), which can be supported by and/or statically mounted to the rotary union, to a wheel, to the hub, or to any other suitable rotatable wheel component. The tire conduit can be a T-junction (e.g., wherein each arm can be connected to a tire), a cable, or be any other suitable fluid connection to the tire. The tire conduit can be arranged external the wheel hub, within the wheel hub, integrated with the hub, or otherwise arranged. The check valve is preferably arranged within the tire conduit, but can be arranged elsewhere.

Figure 12A:
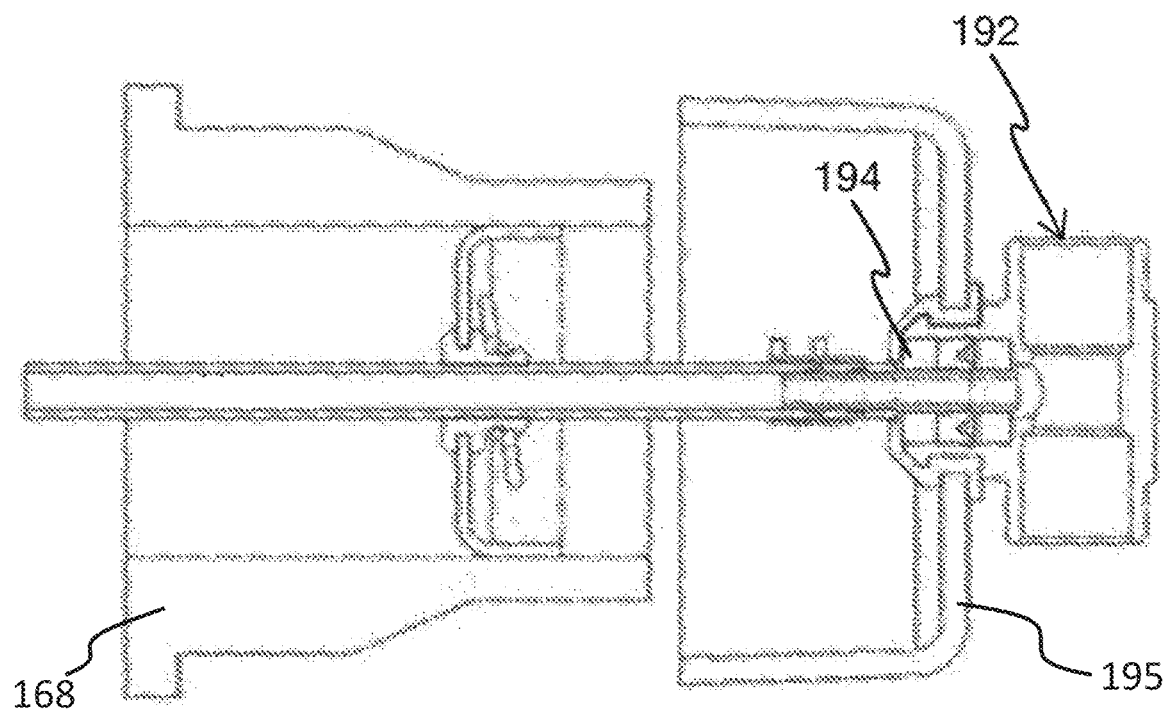
FIGS. 12A-12B show a rotary union allowing for misalignment between the axle and the hubcap of a vehicle.
Figure 12B:
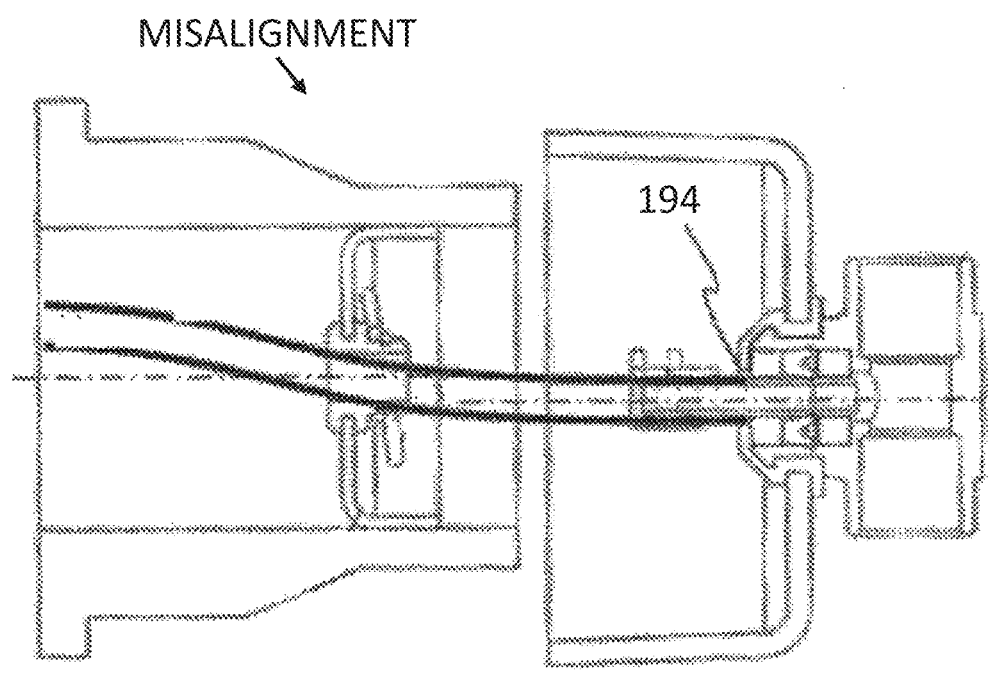

In one variation, the rotary union 194 is configured to allow for misalignment, runout, and/or any other offset between the mounting conduit and the rotational assembly. An example of a rotary union 194 configured to allow for misalignment is shown in FIG. 12.

Figure 11:
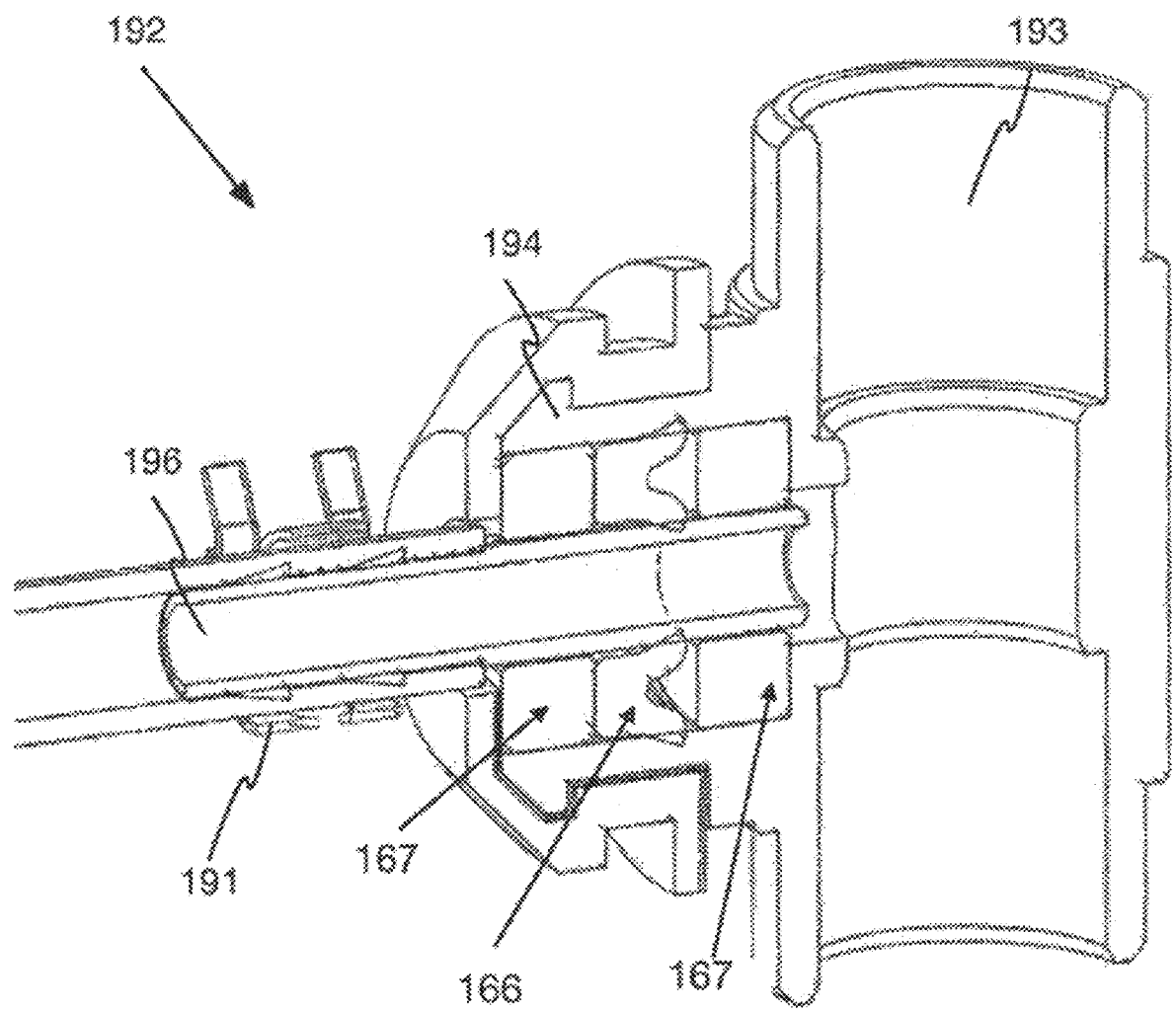
FIG. 11 shows a rotary union.

In one variation, the rotary union 194 further includes one or more seals 166 and one or more bearings 167 that function to fluidly seal the stator-tire conduit interface and facilitate assembly rotation relative to the mounting conduit. In one example, the rotary union 194 has a seal arranged around the surface of the mounting conduit, wherein the seal is arranged next to a bearing (e.g. FIG. 10). In another example, the rotary union has a seal (e.g. an elastomer seal) arranged between an inner and outer bearing (e.g. FIG. 11).

The rotational assembly 192 can further include any number and arrangement of additional components, such as but not limited to: seals, bearings, retaining rings, attachment pieces, purge channels, and housings.

Figure 8:
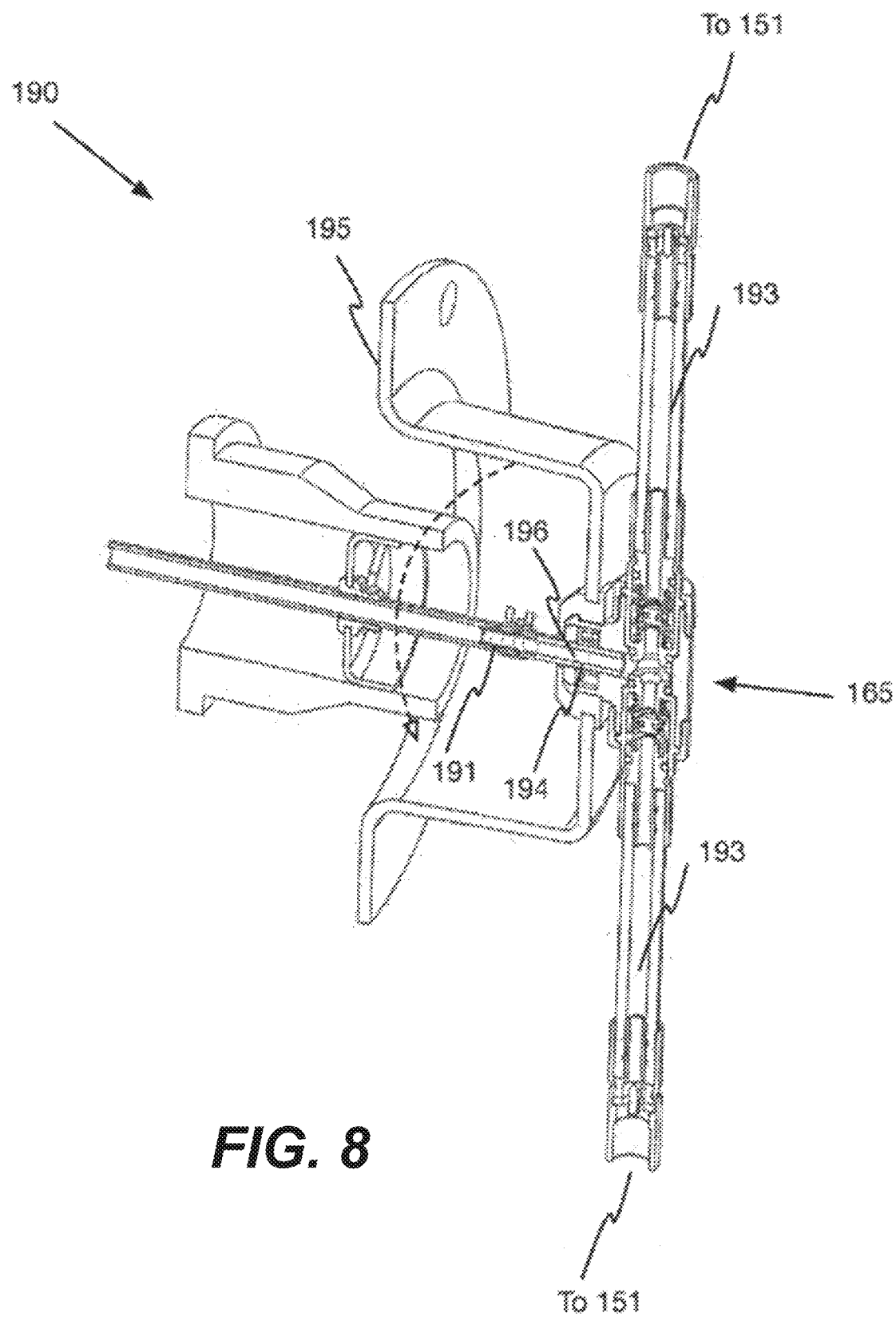
FIG. 8 shows a mounting mechanism retrofittably installed on a hubcap.
Figure 9:
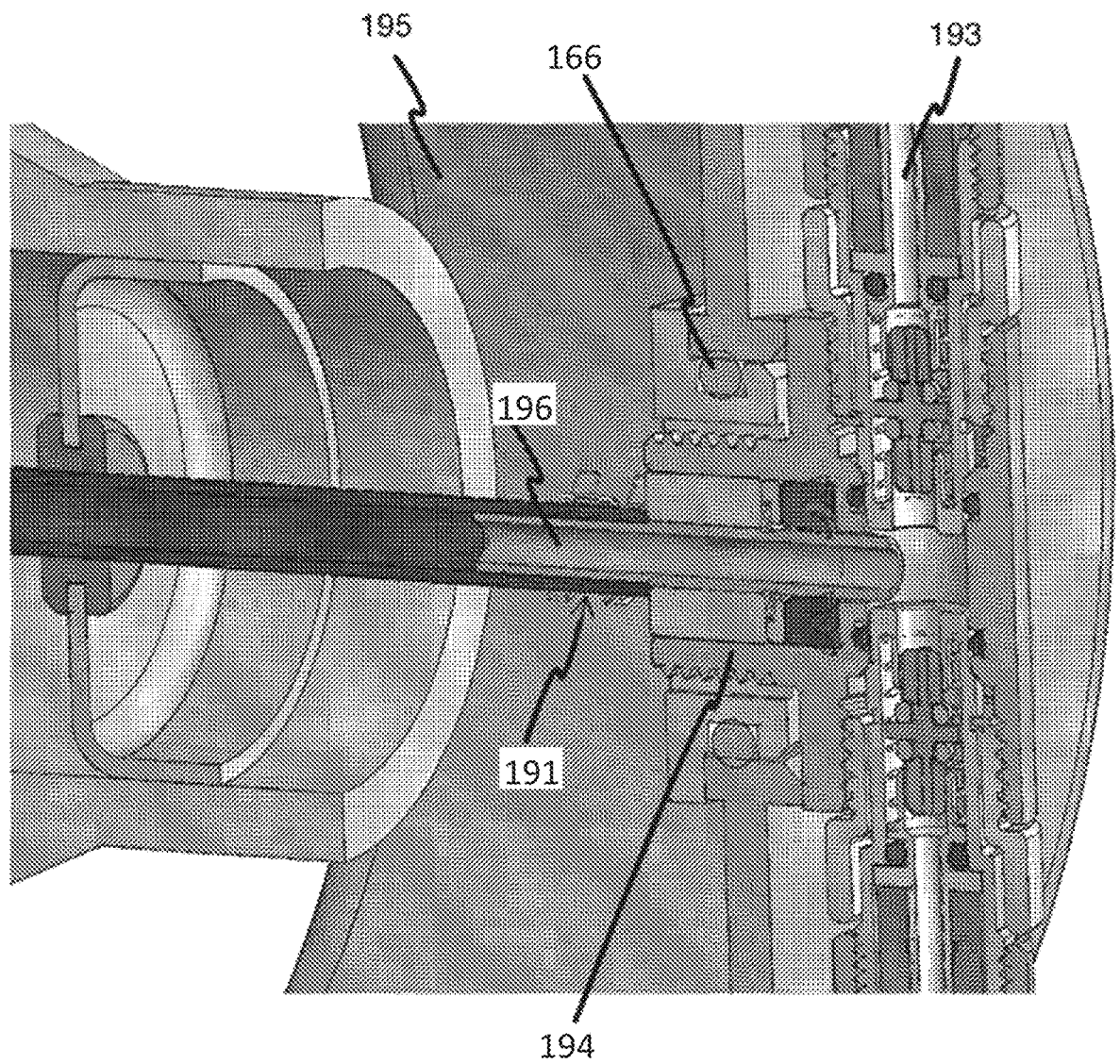
FIG. 9 shows a mounting mechanism.

In one variation, the mounting mechanism 190 is arranged in a tee assembly 165 (e.g. FIG. 8), wherein the rotational assembly 192 is arranged along a single axis, which is oriented perpendicular to mounting conduit. In one example, shown in FIG. 8, the rotational assembly attaches to two tire valves. In another example, the rotational assembly attaches to one tire valve. In another example, shown in FIG. 9, the mounting mechanism is configured to interface with hubcaps having a 1.125-inch vent with a radial O-ring seal, the radial O-ring seal having a threaded interface to all locking and rigid clamps to interface with varying hubcap thicknesses.

3. Method.

Figure 2:
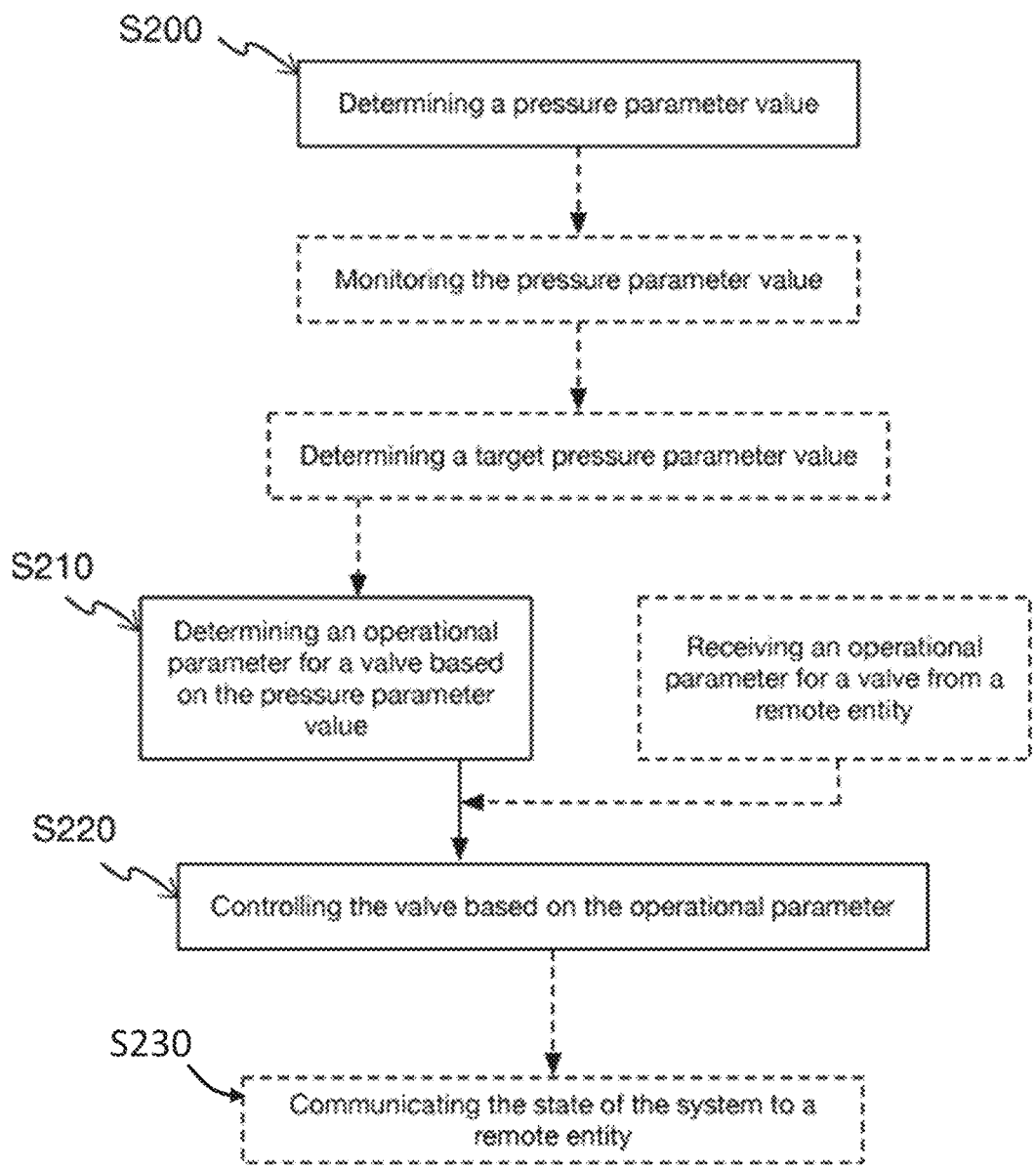
FIG. 2 shows a flowchart diagram illustrating steps in a method for managing pressure in a tire.
Figure 3A:
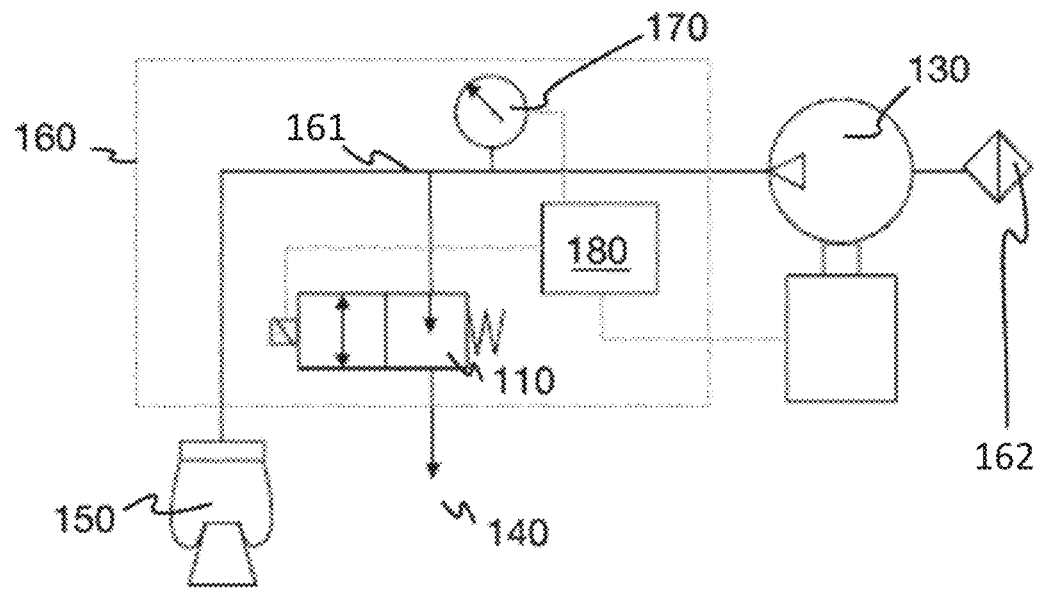
Figure 3B:
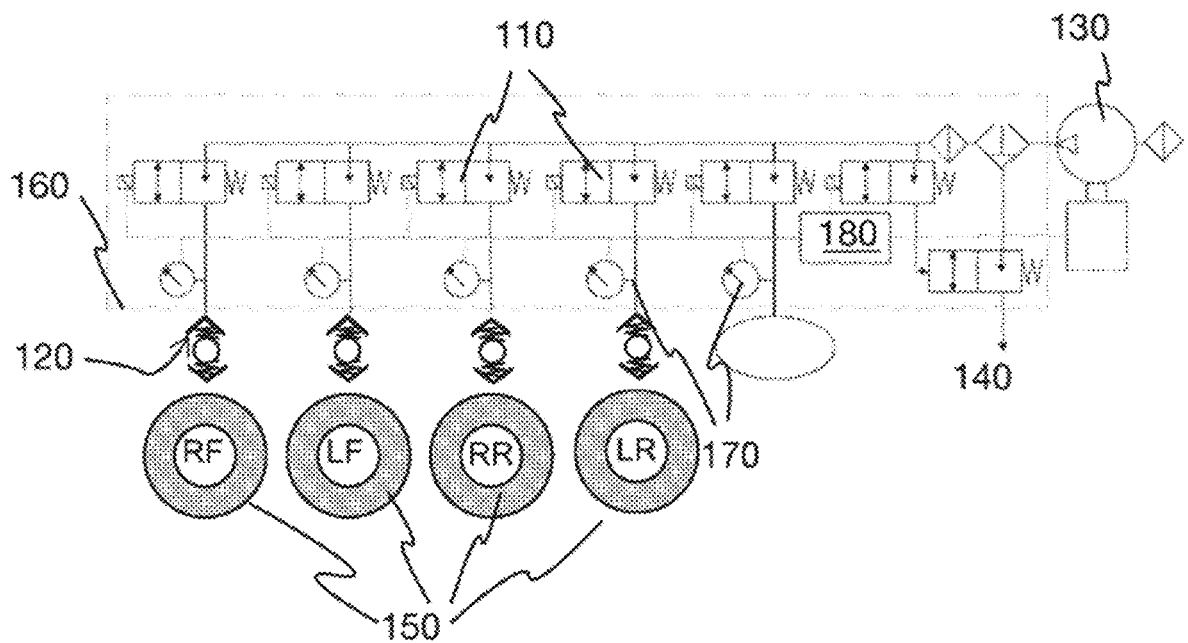

The method for managing a tire functions to enable dynamic control of air flow into and out of a tire. As shown in FIG. 2, the method includes: determining a pressure parameter value S200, determining an operational parameter for a valve based on the pressure parameter value S210, and controlling the valve based on the operational parameter S220. The method can further include communicating the state of the system to a remote entity S230.

The method is preferably performed by, using, and/or in cooperation with the tire management system described above. However, the method can alternatively be performed using any other suitable tire or vehicle management system, such as that disclosed in U.S. Provisional Application No. 62/384,652 filed 6 Sep. 2017, which is incorporated herein in its entirety by this reference. Additionally or alternatively, the method can be performed with a user device, a remote computing system (e.g. a server), or any other suitable computing system.

In one example, the method includes: determining a target deflated tire pressure; dynamically cycling a control valve, fluidly connected between the tire and an air sink, between an open and closed position (e.g., in situ, while the vehicle is in motion); monitoring a pressure change rate when the control valve is in the open position; determining control valve cycling parameters (e.g., cycling frequency, open duration) based on the pressure change rate; cycling the control valve according to the cycling parameters until the current tire pressure substantially matches the target tire pressure; and in response to upstream system exhaustion (e.g., pressure drop beyond a threshold rate), automatically (e.g., passively or actively) sealing a check valve arranged within a fluid manifold between the control valve and the tire. Alternatively, the cycling parameters can be predetermined. This example can optionally include determining an instantaneous tire pressure; determining a deflation duration based on the cycling parameters and the difference between the target tire pressure and the instantaneous tire pressure; and cycling the control valve for the deflation duration. A similar process can be used to inflate the tire in-situ, wherein the control valve can be fluidly connected between the tire and a pressurized air source.

3.1 Determining a Pressure Parameter Value.

Determining a pressure parameter value S200 functions to assess the current state of the system. The pressure parameter can be the element pressure (e.g., compressor pressure, tire pressure, ambient pressure), a pressure differential between two or more points (e.g., pressure difference between the tire and compressor), a pressure change (e.g., the pressure increase or decrease over a period of time), a pressure change rate (e.g., how fast the pressure is increasing or decreasing), or be any other suitable pressure parameter. The pressure parameter value can be: calculated, measured, estimated, predicted, selected, or otherwise determined. Additionally or alternatively, determining a pressure parameter value functions to specifically assess the current state of a tire (e.g. overinflated, underinflated). Preferably the pressure parameter value is determined using one or more pressure sensors (e.g., as described above), but can alternatively be determined by another type of sensor (e.g. temperature sensor), a visual means (e.g. an image of a tire), a volume assessment (e.g. volume of a tire), or any other device or method. The pressure parameter value is preferably determined during the key-on state of a vehicle but can alternatively be determined during the key-off state. The pressure parameter value is preferably determined dynamically. In one variation, the pressure parameter value is determined continuously. In a second variation, the pressure parameter value is determined at a discrete set of times. In a third variation, the pressure parameter value is determined at or after the detection of a specific event (e.g. a specific terrain type, a change in vehicle load, a threshold incline level, a particular weather condition, key-on or key-off state of the vehicle, etc.). In a fourth variation, the pressure parameter value is determined upon command by an operator of the vehicle (e.g. a driver, fleet command center operator, etc.). Alternatively, the pressure parameter value can be determined at any suitable time.

Preferably, more than one pressure parameter value is determined at a given time. Alternatively, a single pressure parameter value or no pressure parameter value can be determined. Preferably, the pressure parameter value is determined at an air system element (e.g. a tire). Additionally or alternatively, the pressure parameter value (e.g. pressure change rate) is determined between air system elements, between an air system element and another element (e.g. atmosphere), between any suitable elements in a vehicle, or at a remote location (e.g. cloud-based server, fleet command center, etc.). Further alternatively, the pressure parameter value can be determined at any of the locations described above, or at any other suitable location. In one variation, the pressure parameter value in a manifold is determined (e.g. from a pressure sensor coupled to the channel of the manifold).

Determining a pressure parameter value can additionally or alternatively be performed by or in conjunction with an ECU (e.g. processor). In one variation, the pressure parameter value is determined through a calculation. In one example, the pressure parameter value is calculated as the difference between two or more pressure parameter values, wherein the two or more pressure parameter values are taken at different times and/or at different locations in the system. In another variation, the pressure parameter value is estimated using an algorithm of the ECU (e.g. a machine learning algorithm). In another variation, the pressure parameter value is approximated from another pressure parameter value (e.g. a pressure parameter value determined earlier) based on predetermined thresholds and/or models.

The method can further include dynamically determining, monitoring, and or/recording a pressure parameter value.

The method can further include determining a target pressure parameter value, wherein the target pressure parameter value can be determined from a lookup table, calculated (e.g., using a predictive model, any other suitable equation, etc.), predicted using a deep learning algorithm, retrieved from a database (e.g. vehicle condition database described above), determined by an operator of the vehicle, or otherwise determined. The target pressure parameter can be a target tire pressure, a target manifold pressure, or a target pressure associated with any element in the system or vehicle. The target pressure parameter value can include: a target pressure, a target pressurization rate, a pressurization duration, or any other target parameter. The target pressure can be predetermined, determined once, iteratively determined (e.g., based on new, up-to-date measurements), or determined at any suitable frequency or time. In one example, different load magnitudes and/or distributions can be associated with different target tire pressures (e.g., wherein the associated target tire pressures can be empirically determined, manually determined, or otherwise determined). In a second example, different pressure differences between the target tire pressure and the current tire pressure can be associated with different pressurization rates and/or durations. In a third example, different pressure differences between the current tire pressure and the air source pressure can be associated with different pressurization rates, check valve operation parameters (e.g., cycling frequencies, open duration, etc.), and/or pressurization durations. However, the target pressure parameter can be otherwise determined.

In one variation, a pressure parameter value is determined after activating a specified set of operational modes for one or more control valves, wherein the operation of the control valves functions to selectively isolate elements coupled to those control valves from contributing to the pressure parameter value. In one example, for instance, a pressure parameter value for the tire alone is measured in the channel by assigning a closed configuration to the control valves arranged between the channel and any element other than a tire.

3.2 Determining an Operational Parameter for a Valve Based on the Pressure Parameter Value.

Determining an operational parameter for a valve based on the pressure parameter value S210 functions to specify a future configuration of the system. The operational parameters preferably include the operational modes of the control valves, as described above. Additionally or alternatively, the operational parameters can include the operational modes of the check valves. Further additionally or alternatively, the operational parameters can include a duration for which an operational mode persists, a transition between operational modes, a frequency (e.g. pulse repetition frequency) of the transition between operational modes, or any other parameter.

Preferably, the operational parameter is determined by an ECU (e.g. microcontroller), wherein the ECU is coupled to one or more valves. Alternatively, the operational parameter is determined from a remote information source (e.g. lookup table) as described above, calculated in conjunction with a remote server, predetermined by the system, predicted using machine learning, determined in accordance with another operational parameter, determined using any of the methods in S200, or otherwise determined.

S210 is preferably performed after S200, but can alternatively be performed before S200, wherein S200 serves as a check to see if the rest of the method can be eliminated in the absence of S200 (e.g. when the operational parameters are predetermined), for instance.

In one variation, an operational parameter is determined based on a target pressure parameter value. In a first example, for instance, when the target tire pressure is higher than the current tire pressure, a control valve is assigned to operate in an open configuration, wherein the open configuration permits air flow from an air source to the tire. In a second example, wherein the pressure change rate over time is found to be constant, all the control valves in the system are assigned to operate in an open configuration.

In a second variation, the operational parameter includes a temporal component (e.g. a specified frequency, duration, etc.). In one example, the operational parameter for a control valve prescribes that the control valve alternates between an open and a closed configuration with a prescribed pulsing frequency during tire inflation (e.g. FIG. 7A), tire deflation (e.g. FIG. 7C), or at any other time. This operational parameter, wherein the control valve alternates between operational modes, can, for instance, maintain a low pressure differential across a check valve and function to prevent the check valve from sealing, wherein the check valve is in fluid communication with the control valve. In a second example, the operational parameter for a control valve prescribes an operational mode and a duration for which the operational mode will be assigned to the control valve. The specific duration can, for instance, be dynamically determined based on the magnitude of one or more pressure parameter values (e.g. magnitude of the pressure change rate at a tire). In another instance, the duration is predetermined.

The cycling frequency can be between 0.5 Hz-5 Hz, higher than 5 Hz, lower than 0.5 Hz, 2 Hz, or be any other suitable frequency. In one example, the cycling frequency and open duration per cycle can be predetermined, wherein the cycling duration can be determined based on the difference between the current tire pressure and the target tire pressure. In a second example, the larger the pressure difference between the tire and the endpoint (e.g., air source or air sink), the higher the control valve cycling frequency and shorter the open duration per cycle, wherein the cycling frequency can be lowered and/or the open duration per cycle can be shortened as the pressure difference drops. In this example, the cycling frequency and/or open duration can be selected based on the instantaneous, past, or anticipated pressure differential. In a third example, the higher the pressure change rate, the higher the control valve cycling frequency and/or shorter the open duration per cycle, wherein the cycling frequency can be lowered and/or the open duration per cycle can be shortened as the pressure change rate drops. However, the control valve operation parameters can be otherwise determined.

3.3 Controlling the Valve Based on the Operational Parameter.

Controlling the valve based on the operational parameter S220 functions to activate a specified system configuration. The valves are preferably the control valves discussed above, more preferably the control valve fluidly connected to the tire port (e.g., the third control valve), but can alternatively be any other suitable valve. Preferably, the specified system configuration is selected based on one or more of: optimal tire performance, minimal tire wear-and-tear, and optimal vehicle safety, but can alternatively be predetermined or selected for in any suitable way by any suitable means.

Preferably, the valve is controlled by a controller (e.g. electronic control unit), wherein the controller is electrically connected to the valve. Additionally or alternatively, the valve can be controlled by a controller not electrically connected to the valve (e.g. processor in a user device, remote server, etc.). Additionally or alternatively, one or more valves can be passively controlled. In one variation, a valve is mechanically controlled by a pressure differential between the valve's inlet and outlet.

Preferably, the valves are controlled based on operational parameters determined in S210, but can additionally or alternatively be operated in any suitable way. Preferably, S220 is performed after S210, but can additionally or alternatively be performed at any point in the method. In one variation, S210 and/or S220 are performed multiple times throughout the method in order to dynamically manage tire pressure during the operation of the vehicle. The valves are preferably controlled during vehicle operation (e.g., while the vehicle is in transit, being driven, etc.), but can alternatively be controlled at any other suitable time.

3.4 Communicating the State of the System to a Remote Entity.

Figure 13:
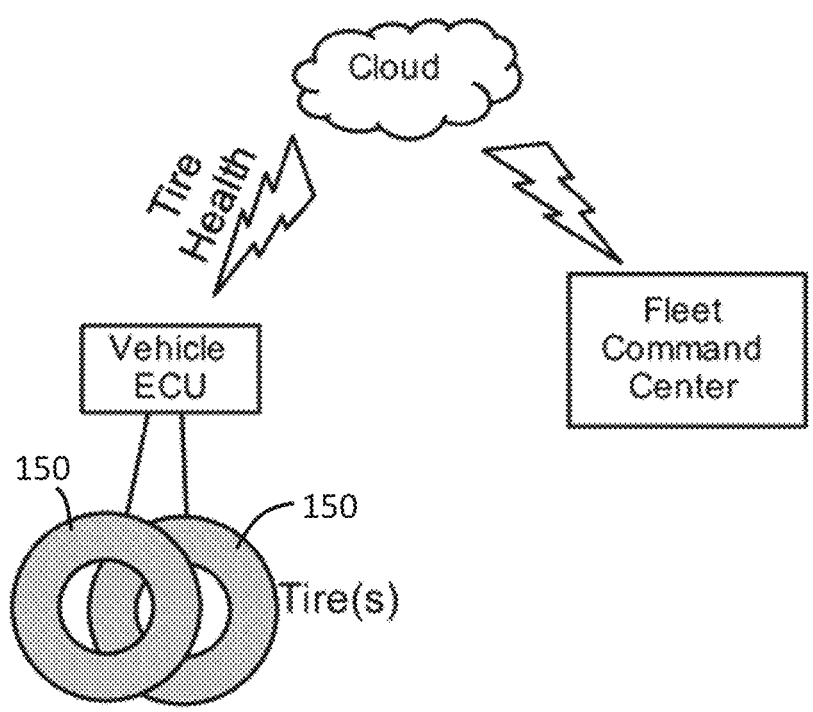
FIG. 13 shows a block diagram illustrating communication between the system and a remote entity.

The method can further include communicating the state of the system to a remote entity S230, which can function to increase vehicle safety and/or optimize vehicle performance. Preferably, the remote entity is a fleet command center (e.g. FIG. 13), wherein the fleet command center manages one or more vehicles (e.g. trucks). Additionally or alternatively, the remote entity can be an operator of the vehicle (e.g. driver), a remote server (e.g. database, lookup table), a regulatory agency, or any other entity. Preferably, S230 is a form of telematics, but can alternatively be any form of telecommunication, local communication, etc. Preferably the state of the system includes pressure parameter values, but can additionally or alternatively include operational modes of one or more valves, any of the information described above, or any other information related to the operation of a vehicle.

Preferably S230 is performed with a controller of the vehicle, such as any of the controllers described above. Additionally or alternatively, S230 is performed with a user device (e.g. a mobile device), an interactive device in the vehicle (e.g. a touchpad, button interface, voice-activated speaker system, etc.), or with any other suitable device or communication means. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component Additionally, S230 can be performed in conjunction with one or more sensors (e.g. pressure sensor, accelerometer, etc.). Preferably, S230 is performed dynamically (e.g. continuously) during the operation of the vehicle, but can alternatively be performed a single time, two or more discrete times, at the occurrence of an event (e.g. tire pressure parameter value falls below a threshold), at the prompting of the remote entity, or at any other time.

Preferably, S230 includes the transmission of information (e.g. pressure parameter values, geographic coordinates, etc.) from the vehicle to a remote entity, but can additionally or alternatively include the transmission of information (e.g. operational parameters) from a remote entity to the vehicle.

In one variation, S230 includes transmitting pressure parameter values to a fleet command center. In one example, the pressure parameter values are transmitted dynamically during the operation of the vehicle. In this example, the pressure parameter values are monitored at the fleet command center. If it is determined by the fleet command center that the pressure parameter values have fallen outside of a suitable range, a notification is sent to the driver of the vehicle (e.g. through a user device). Additionally or alternatively, operational commands for the control valves are sent to a controller from the fleet command center.

The method can optionally include probing the fluid system, which functions to determine whether the check valves between the system and each tire are open. This can be particularly useful during startup, where the check valves can be closed in the upstream direction (e.g., sealing the tire from the system due to low system pressure). Probing the fluid system can include: slowly pressurizing the manifolds connected to the tires, monitoring the pressure change in the manifold over time, counting the number of pressure drops, and ceasing manifold pressurization after the number of pressure drops matches an expected number of tires on the vehicle. Probing the fluid system can optionally include: in response to detecting a sealed valve (e.g., valve sealed in the downstream or tire-side direction), generating and/or transmitting a notification to a user device. The sealed valve can be detected in response to: pressurization beyond a threshold time duration, manifold pressure exceeding a threshold pressure (e.g., less than or equal to the first or second sealing pressure), the pressure change rising faster than a threshold rate, or otherwise detected.

The method can optionally include monitoring a brake system (e.g., with a secondary pressure sensor), wherein the method is performed after the brake system has been fully pressurized. The method can optionally include monitoring a fluid suspension system's pressure (e.g., with a secondary pressure sensor), and determining (e.g., calculating, estimating, selecting, etc.) a load magnitude and/or distribution based on the fluid suspension system's pressure and/or pressure distribution across the suspension lines. The fluid within the suspension system can be: a gas, a liquid, a compressible fluid, a noncompressible fluid, a Newtonian fluid, a non-Newtonian fluid, or any other suitable fluid. In one example, the air suspension system can be fluidly connected to the same fluid circuit as the TMS, brake system, and/or any other suitable fluid system. However, the system can include any other suitable set of processes.

Figure 14:
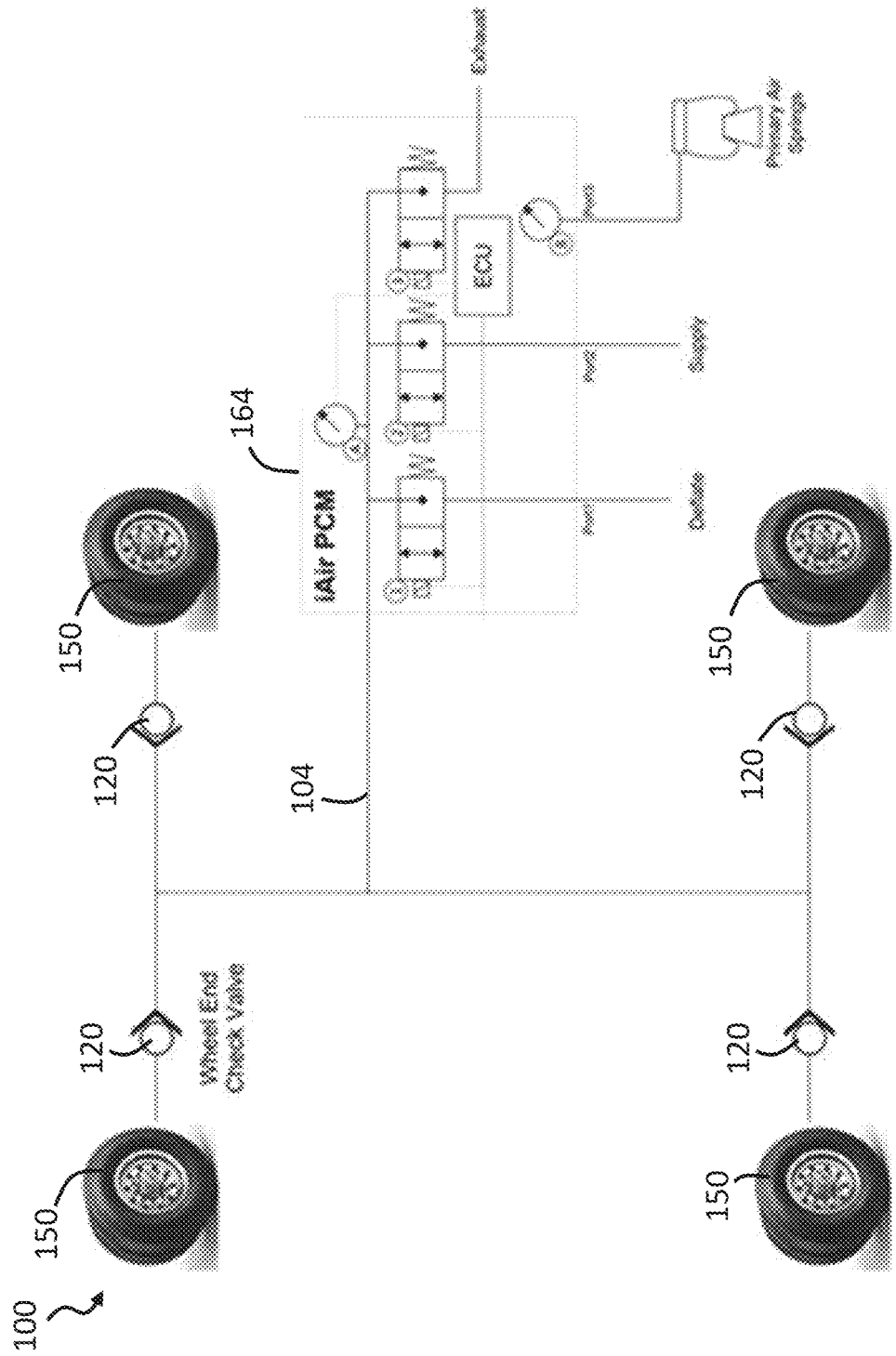
FIG. 14 shows a block diagram of a tire pressure control system.

FIG. 14 shows a block diagram of a tire management system (TMS) 100, including the pressure control module (PCM) 164 configured to inflate four tires 150 in a vehicle. More specifically, the TMS 100 shown in FIG. 14 includes the PCM 164 in fluid communication with a common header 104 that distributes air to each of the tires 150. FIG. 14 also shows a check valve 120, also called a wheel end check valve (WECV) that controls fluid flow between the common header 104 and each of the tires 150.

A problem with conventional central tire inflation systems can arise if one of the tires 150 has a leak, and air can flow from the other, non-leaking tires 150 air through the open WECVs 120, pressurizing the system, and thereby masking the leak. This can occur with both normally-open and normally-closed WECVs. The PCM 164, with its onboard pressure sensor 170, watches system line pressure—when the non-leaking tires equalize to the leaking tire, the system pressure does not drop quickly to alert of a leaking tire—the flow rate out of the other non-leaking tires fills the system line with their pressure, trying to inflate the leaking tire which has a restriction at the WECV 120 that allows system line pressure to read the higher pressures of the non-leaking tires. This masks or hides the actual pressure of the leaking tire, and the PCM 164 cannot alert a driver/operator or fleet command (through telemetry) that there is a serious tire pressure problem.

Figure 15:
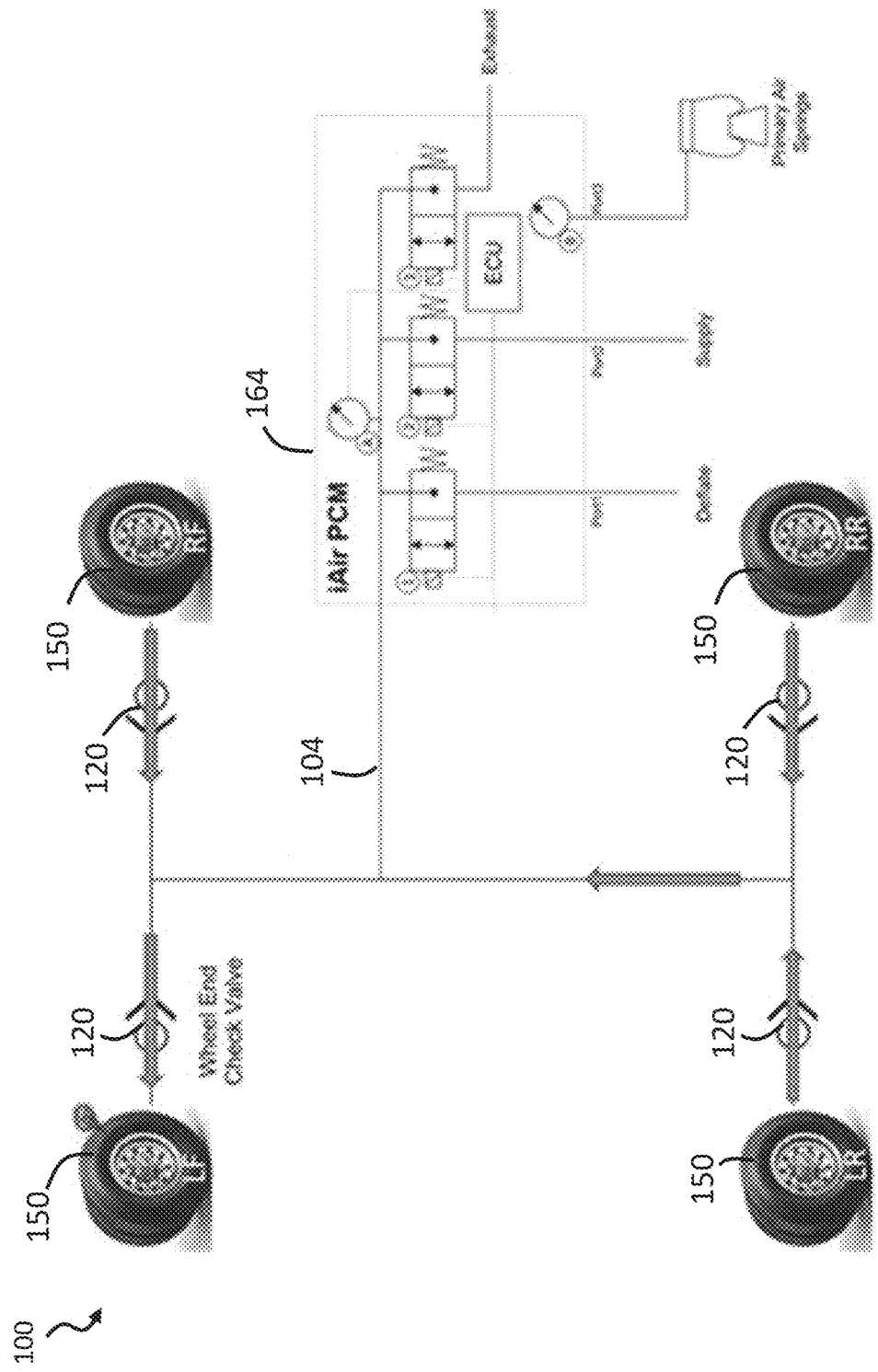
FIG. 15 shows the tire pressure control system of FIG. 14, with a slow leak in one of the tires.

FIG. 15 shows the tire pressure control system of FIG. 14, with a slow leak in one of the tires 150. The present disclosure provides a novel leak detection method for detecting a slow leak in one of the tires 150. This novel leak detection may be described as: "get out and then ramps back in." In short, the leak detection method of the present disclosure reduces pressure in the common header 104 (i.e. it "gets out" of pressurizing the common header), and then it slowly ramps pressure back up in the common header 104 (i.e. it "ramps back in").

If a slow leak is determined by the ECU 180, the ECU 180 may commands a full system exhaust, dropping system pressure in the common header 104 to zero, and thereby closing all the WECVs 120. The ECU 180 may then pulse the intake valve 111, slowly ramping up system pressure in the common header 104 while monitoring the system pressure with the pressure sensor 170—this way, the ECU 180 can see at least one of the tires 105 (e.g. the left-front (LF) tire) with a low pressure indicative of a leak, and which causes the ramping-up of the system pressure in the common header 104 to stall, once the system pressure in the common header 104 reaches a pressure equal to the pressure of the left-front tire.

Figure 16:
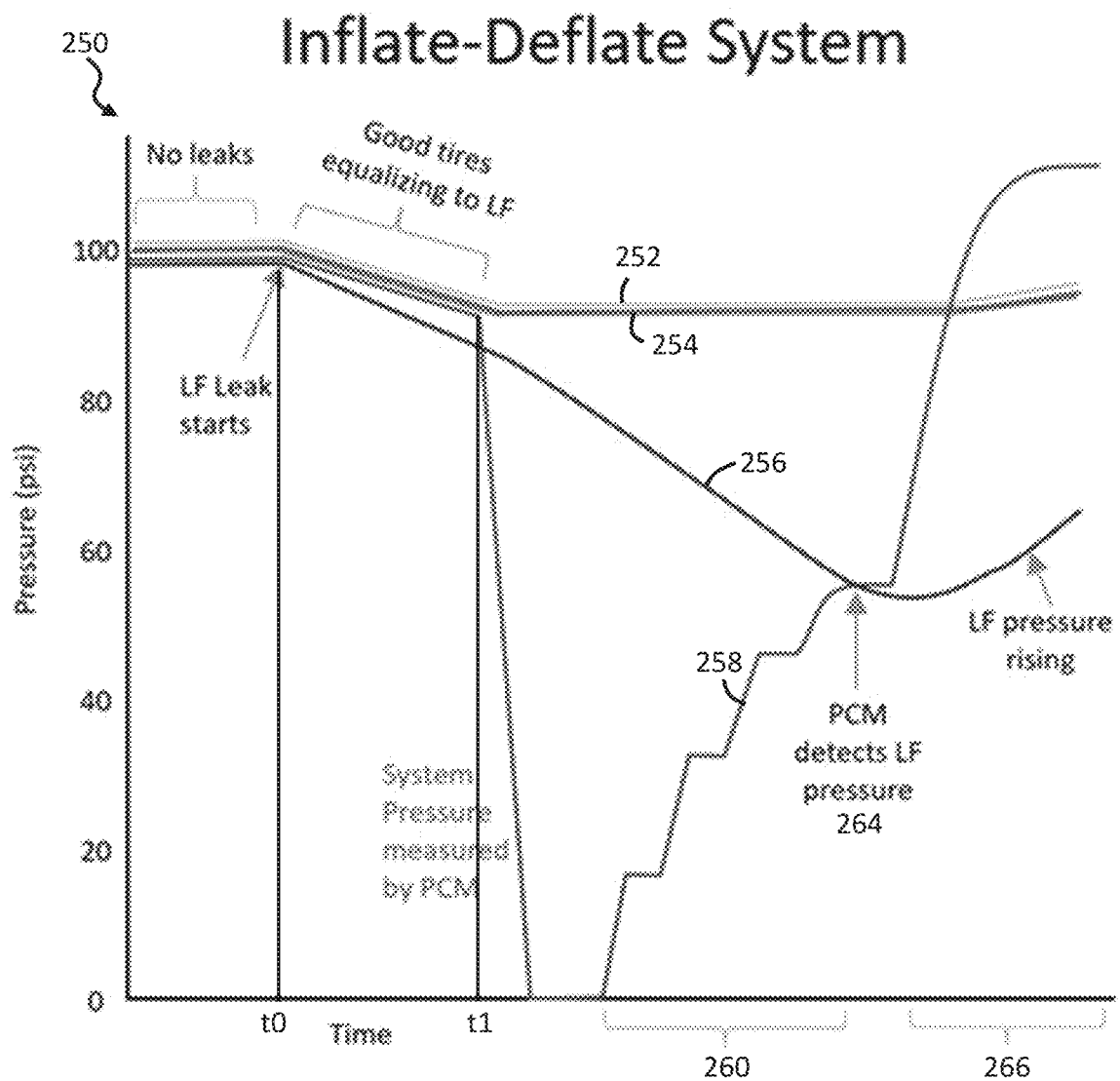
FIG. 16 shows a graph illustrating pressures when checking a tire pressure in a system with inflate and deflate control capabilities.

FIG. 16 shows a first graph 250 of pressure vs time, showing the tire pressures when checking a tire pressure in a system with inflate and deflate control capabilities. The first graph 250 includes a first plot 252 and a second plot 254 showing pressures in "good" or non-leaking tires with an operating pressure of about 100 PSI. The first graph 250 also includes a third plot 256 of pressure in a leaking left-front (LF) tire. The first graph 250 also includes a fourth plot 258 of pressure in the common header 104, as measured by the pressure sensor 170. At time t0, the left-front tire starts to leak. At subsequent time t1 the ECU 180 reduces the pressure in the common header 104 to 0 PSI. For example, the ECU 180 may open the exhaust valve 112 and the output control valve 113 at time t1. After time t1, the ECU 180 gradually adds air to the common header 104 at a relatively low flow rate to gradually increase the fluid pressure in the common header 104 during a first time period 260.

While gradually adding the air to the common header 104, the pressure in the common header 104 stabilizes at a leak-indicative pressure 264, which is substantially lower than the operating pressure. This stabilizing at the leak-indicative pressure 264 is caused by the common header 104 reaching the pressure of the left-front tire, causing its WECV to open, and the gradual adding air to start to pressurize the left-front tire.

After detecting the leak of one or more tires at the leak-indicative pressure 264, the ECU 180 may proceed to inflate the tires by adding fluid to the common header 104 at an inflation flow rate substantially higher than the first flow rate, as shown by the a third plot 256 of pressure in the left-front tire increasing during a second time period 266. For example, the ECU 180 may command the intake valve 111 and the output control valve 113 to a full-open position and/or to a full-open duration in response to determining the leak.

Figure 17:
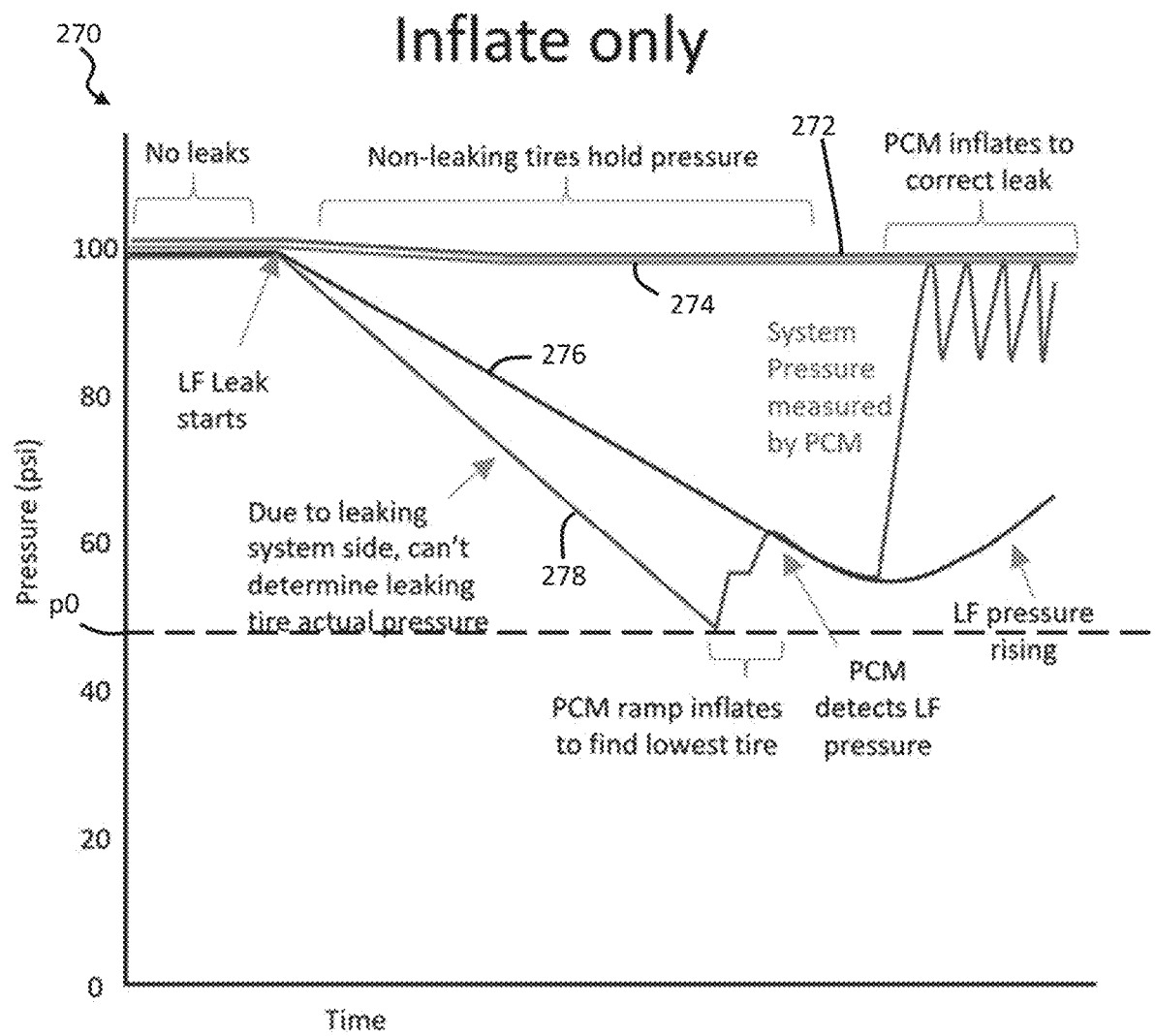
FIG. 17 shows a graph illustrating pressures when checking a tire pressure in a system with only inflate control capability.

The control solution of the present disclosure may also be used with systems having only inflate control capability, where the system we cannot "get out" and exhaust system pressure, and where the normally-closed valves do not equalize to the leaking tire. Inflate only systems use normally closed valves, where after an inflation event we cannot "see" the actual tire pressure because the WECV closes immediately. The system also must be designed to allow system-side leaks due to rotary union leakage—so after an inflate event, system pressure will decay which will again mask a leaking tire. Our novel solution is to "ramp-in" and see the leaking tire pressure. See functional plot of inflate-only below FIG. 17 shows a second graph 270 of pressure vs time, showing the tire pressures when checking a tire pressure in a system with only inflate control capability. The second graph 270 includes a fifth plot 272 and a sixth plot 274 showing pressures in "good" or non-leaking tires with an operating pressure of about 100 PSI. The first graph 270 also includes a seventh plot 276 of pressure in a leaking left-front (LF) tire. The second graph 270 also includes an eighth plot 278 of pressure in the common header 104, as measured by the pressure sensor 170.

The second graph 270 of FIG. 17 is similar to the first graph 250 of FIG. 16, except the pressure in the common header 104 does not fall all the way to zero. Instead, the pressure in the common header 104 (as indicated by the eighth plot 278) falls only to an initial pressure p0, at which point the ECU 180 begins the gradual inflation process. The initial pressure p0 is shown as being about 50 PSI, although the initial pressure p0 can be any value that is less than a low operating pressure of the tires 150, because the pressure in the in the common header 104 is increased from the initial pressure p0 in order to detect a leak.

Figure 18:
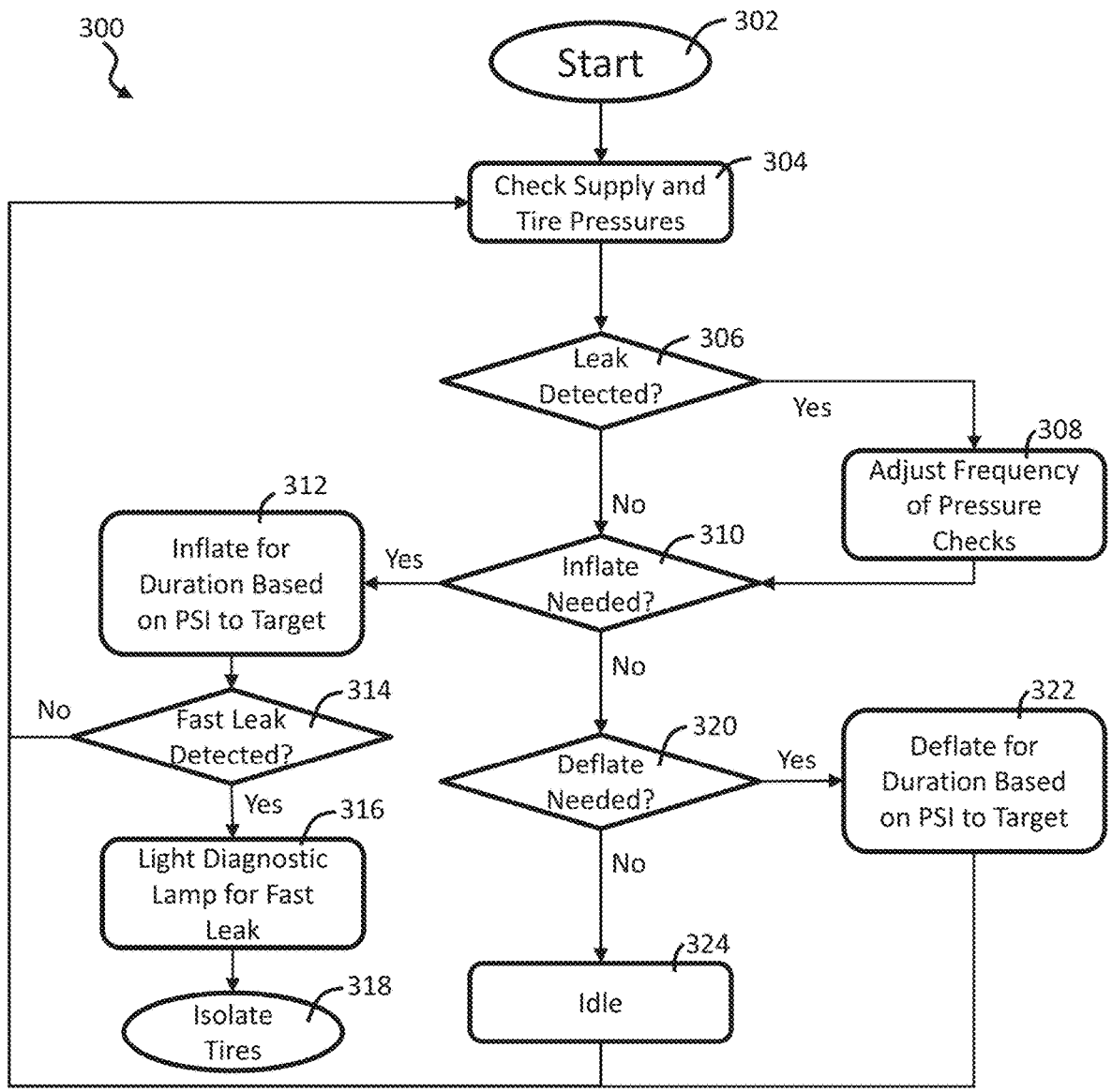
FIG. 18 shows a flow chart illustrating steps in a method for controlling tire pressure in a system with inflate and deflate control capabilities.

FIG. 18 shows a flow chart illustrating steps in a first method 300 for controlling tire pressure in a system with inflate and deflate control capabilities. The first method 300 starts at 302 and proceeds to check supply and tire pressures at step 304. The supply pressure may be measured directly by the pressure sensor 170 in direct fluid communication with the common header 104. Methods for checking tire pressures in the tires 150 are discussed further, below.

The first method 300 also determines if a leak is detected at step 306. Methods for detecting leaks in the tires 150 are discussed further, below.

The first method 300 also adjusts frequency of pressure checks at step 308 and in response to detecting a leak at step 306. For example, the ECU 180 may perform pressure checks on a more frequent basis in response to detecting a leak. The ECU 180 may be better able to monitor a leak to determine if a leak is getting worse and in need of attention.

The first method 300 also determines if an inflation event is needed at step 310. For example, if the ECU 180 detects one or more tires 150 that with a pressure below a predetermined low-operating value, the ECU 180 may determine that inflation is needed.

The first method 300 also inflates the tires 150 at step 312 and in response to determining inflation is needed at step 310. Step 312 may include inflating the tires 150 for a duration of time based on a difference between the pressure in the one or more tires 150 and an operating pressure value. For example, if the ECU 180 detects one or more tires 150 that with a pressure below a predetermined low-operating value, the ECU 180 may open the intake valve 111 and the output control valve 113 for a duration of time that depends on the amount of inflation required.

The first method 300 also determines if a fast leak is detected at step 314 and in response to determining inflation is needed at step 310. For example, if the ECU 180 detects the system pressure, as measured by the pressure sensor 170, decreasing by a predetermined amount over a given period of time, the ECU 180 may signal a fast leak as being detected. The first method 300 may return to step 304 in response to detecting no fast leak at step 314.

The first method 300 also signals a fast leak at step 316 and in response to detecting a fast leak at step 314. For example, the ECU 180 may light a diagnostic lamp, set a diagnostic trouble code (DTC), and/or communicate a message to a remote receiver indicating the detection of the fast leak.

The first method 300 also isolates the tires at step 318 and in response to detecting a fast leak at step 314. For example, the wheel end check valves 120 may be closed to prevent air from flowing out of the non-leaking tires 150 into the common header 104 and out of a leak.

The first method 300 also determines if a deflation event is needed at step 320. For example, if the ECU 180 detects one or more tires 150 that with a pressure above a predetermined high-operating value, the ECU 180 may determine that deflation is needed.

The first method 300 also deflates one or more of the tires 150 at step 322 and in response to determining deflation is needed at step 320. Step 322 may include deflating the tires 150 for a duration of time based on a difference between the pressure in the one or more tires 150 and an operating pressure value. For example, if the ECU 180 detects one or more tires 150 that with a pressure above a predetermined high-operating value, the ECU 180 may open the exhaust valve 112 and the output control valve 113 for a duration of time that depends on the amount of deflation required. The first method 300 may return to step 304 after deflating the tires 150 at step 322.

The first method 300 also includes idling at step 324 and in response to determining that deflation is not needed at step 320. This step 320 may provide a periodic basis for the first method 300.

Figure 19:
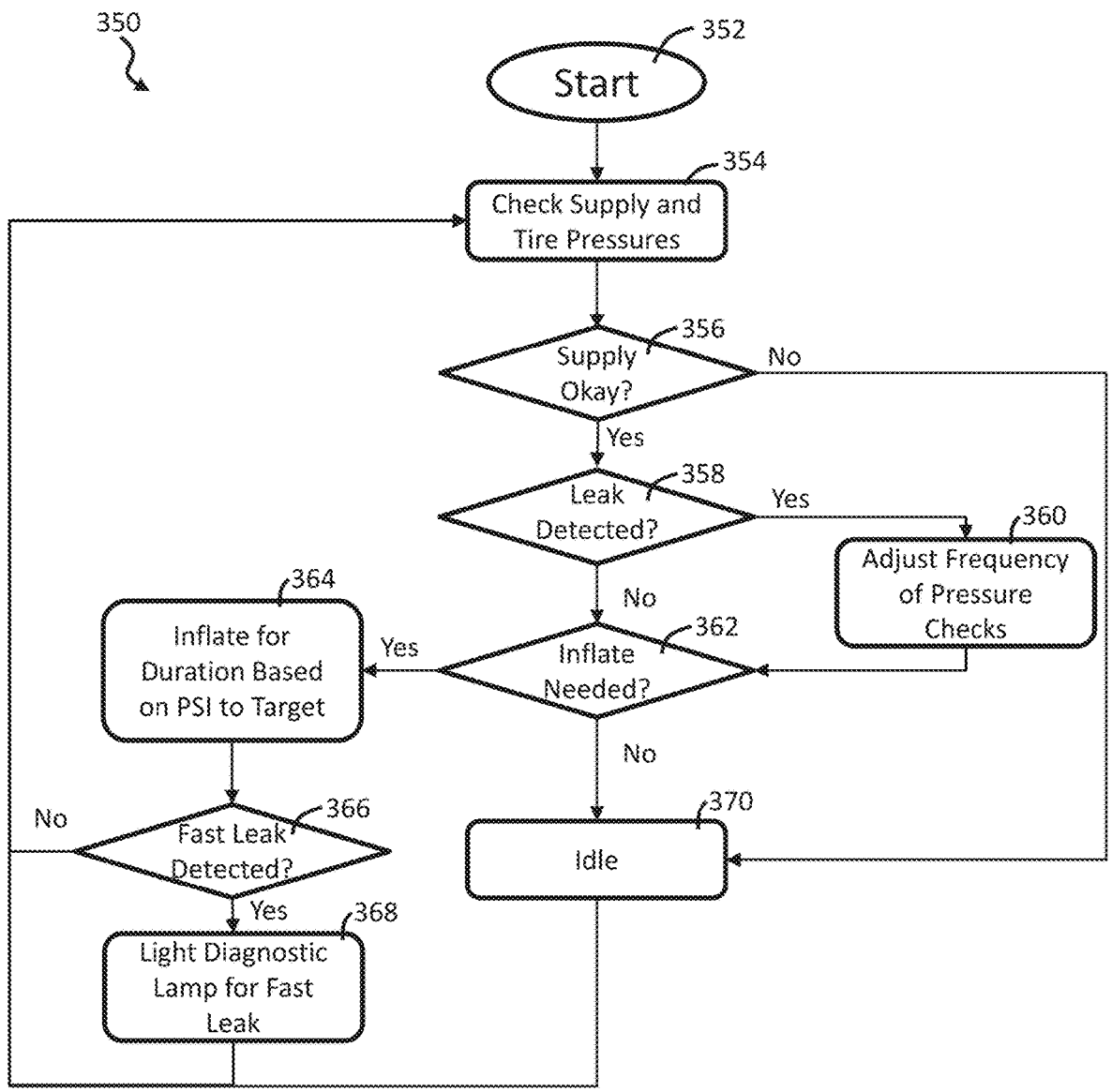
FIG. 19 shows a flow chart illustrating steps in a method for controlling tire pressure in a system with only inflate control capability.

FIG. 19 shows a flow chart illustrating steps in a second method 350 for controlling tire pressure in a system with only inflate control capability.

The second method 350 starts at 352 and proceeds to check supply and tire pressures at step 354. The supply pressure may be measured directly by the pressure sensor 170 in direct fluid communication with the common header 104. Methods for checking tire pressures in the tires 150 are discussed further, below.

The second method 350 also determines if the air supply is good at step 356. For example, the ECU 180 may measure the pressure of an air supply. Alternatively or additionally, step 358 may include receiving a signal from a supply system, such as a controller on a compressor used as an air supply to the system.

The second method 350 also determines if a leak is detected at step 58. Methods for detecting leaks in the tires 150 are discussed further, below.

The second method 350 also adjusts frequency of pressure checks at step 360 and in response to detecting a leak at step 358. For example, the ECU 180 may perform pressure checks on a more frequent basis in response to detecting a leak. The ECU 180 may be better able to monitor a leak to determine if a leak is getting worse and in need of attention.

The second method 350 also determines if an inflation event is needed at step 362. For example, if the ECU 180 detects one or more tires 150 that with a pressure below a predetermined low-operating value, the ECU 180 may determine that inflation is needed.

The second method 350 also inflates the tires 150 at step 364 and in response to determining inflation is needed at step 362. Step 364 may include inflating the tires 150 for a duration of time based on a difference between the pressure in the one or more tires 150 and an operating pressure value. For example, if the ECU 180 detects one or more tires 150 that with a pressure below a predetermined low-operating value, the ECU 180 may open the intake valve 111 and the output control valve 113 for a duration of time that depends on the amount of inflation required.

The second method 350 also determines if a fast leak is detected at step 366 and in response to determining inflation is needed at step 310. For example, if the ECU 180 detects the system pressure, as measured by the pressure sensor 170, decreasing by a predetermined amount over a given period of time, the ECU 180 may signal a fast leak as being detected. second method 350 may return to step 354 in response to detecting no fast leak at step 366.

The second method 350 also signals a fast leak at step 368 and in response to detecting a fast leak at step 366. For example, the ECU 180 may light a diagnostic lamp, set a diagnostic trouble code (DTC), and/or communicate a message to a remote receiver indicating the detection of the fast leak.

The second method 350 also includes idling at step 370 and in response to determining that deflation is not needed at step 362. This step 370 may provide a periodic basis for the second method 350. Step 370 may also be performed in response to determining that the supply is not good at step 356. In this way, the second method 350 may wait and periodically check for the supply to return to a "good" or functional state before performing other tasks, such as checking for leaks, and inflating, if necessary.

Figure 20:
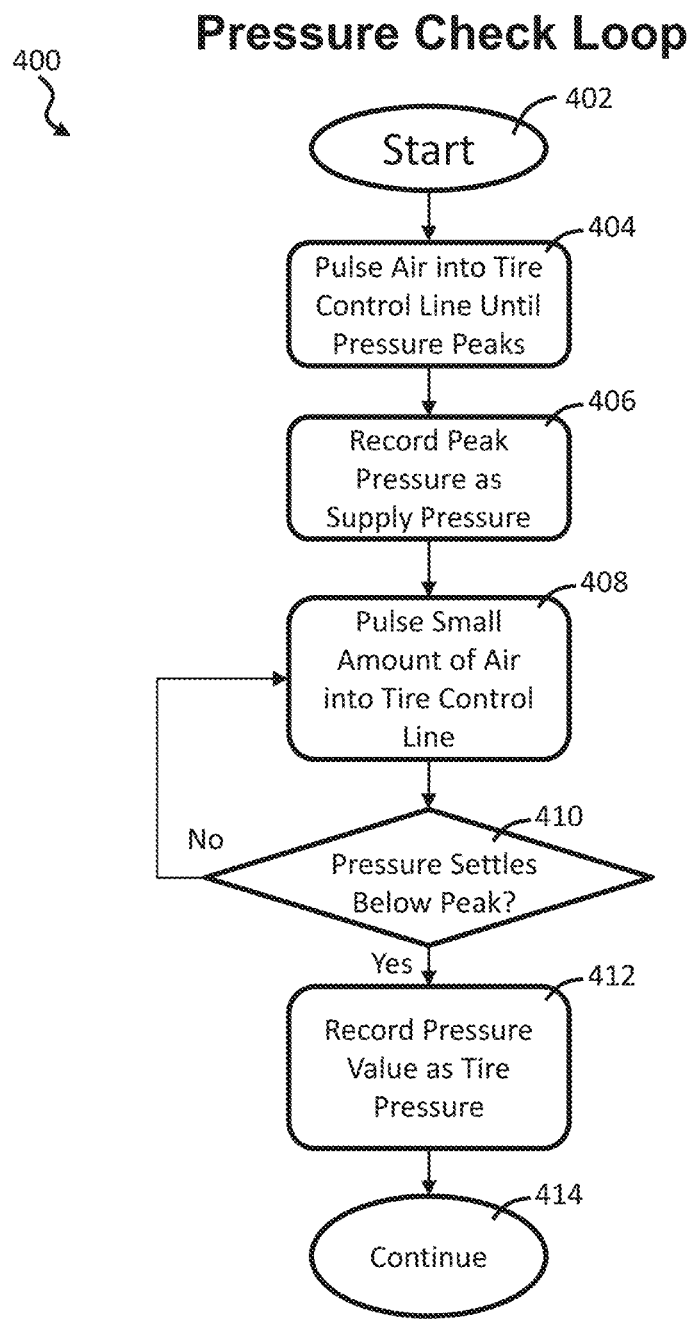
FIG. 20 shows a flow chart illustrating steps in a method for checking a tire pressure.

FIG. 20 shows a flow chart illustrating steps in a third method 400 for checking a tire pressure. The third method 400 may be used, for example, to determine if a leak is detected in any of the tires 150 at step 306 or at step 358.

The third method 400 starts at step 402 and proceeds to pulse air into a tire control line until pressure peaks at step 404. Step 404 may include, for example, the ECU 180 commanding the intake valve 111 and the output control valve 113 to be open to supply pressurized air from the air source 130 to the common header 104, until the pressure in the common header 104, as measured by the pressure sensor 170, stabilizes at a particular value (i.e. the peak pressure).

The third method 400 also includes recording the peak pressure as the supply pressure at step 406. For example, the ECU 180 may record the peak pressure resulting from step 404 as representing the supply pressure.

The third method 400 also includes pulsing a small amount of air into the tire supply line at step 408. Step 408 may include, for example, the ECU 180 commanding the intake valve 111 and the output control valve 113 to be open for one or more durations to supply pressurized air from the air source 130 to the common header 104.

The third method 400 also includes determining, after step 408, if the pressure in the tire supply line (e.g. the common header 104) settles below the peak pressure at step 410. If the pressure does not settle at a pressure below the peak pressure, the third method 400 may return back to step 408 and continue to pulsing another small amount of air into the tire supply line.

The third method 400 also includes recording a pressure below the peak pressure as a low-tire pressure at step 412 and in response to determining that the pressure in the tire supply line having settled below the peak pressure at step 410. The third method 400 may continue out of the pressure check loop at step 414 and after step 414.

Figure 21:
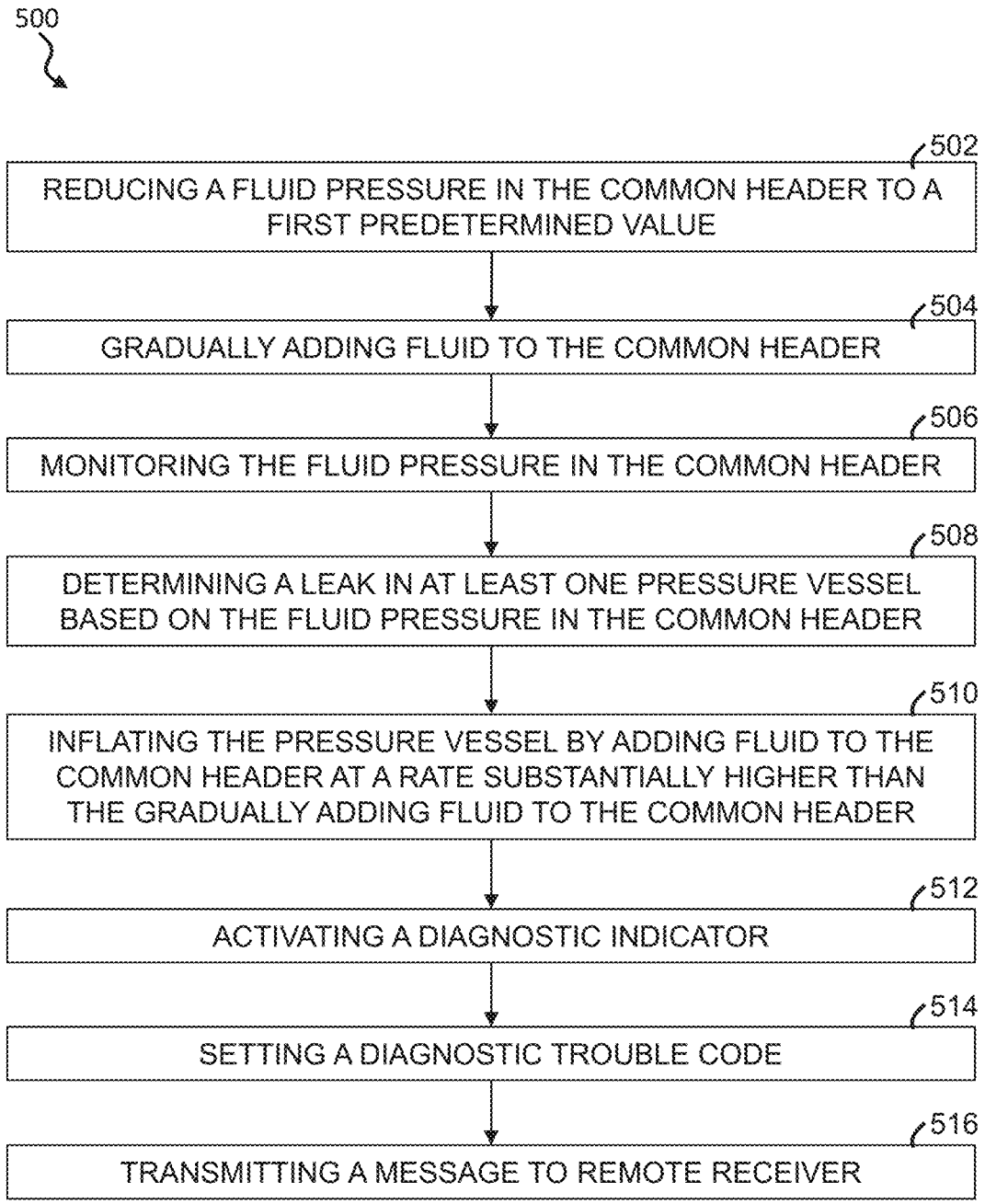
FIG. 21 shows a flow chart illustrating steps in a method for detecting a leak in a pressure vessel.

FIG. 21 shows a flow chart illustrating steps in a fifth method 500 for detecting a leak in a pressure vessel of a system including a plurality of pressure vessels in fluid communication with a common header. In some embodiments, the pressure vessels may include tires installed on a vehicle. However, the fifth method 500 may be used with other types of pressure vessels, such as tanks in a tank farm.

In some embodiments, the common header is in fluid communication with each of the tires via a wheel-end check valve configured to allow fluid flow from the common header to a corresponding one of the tires while blocking fluid flow in an opposite direction.

The fifth method 500 includes reducing a fluid pressure in the common header to a first predetermined value at step 502. The first predetermined value may be a pressure value below an operating pressure of the plurality of pressure vessels. In some embodiments, the first predetermined value may be equal to or approximately equal to an ambient air pressure.

In some embodiments, step 502 may include opening an exhaust valve to release fluid from the common header. For example, in an inflate/deflate type system, the ECU 180 may command the exhaust valve 112 to release air from the common header 104. Alternatively, step 502 may include fluid leaking from the common header with no controlled valves in fluid communication with the common header being commanded open. For example, in an inflate-only type system, the ECU may wait and monitor the pressure in the common header 104 as fluid leaks therefrom. For example, air may leak out of the common header 104 from one or more rotary unions that couple the common header 104 to the tires 150.

The fifth method 500 also includes gradually adding fluid to the common header at a first flow rate at step 504 to increase the fluid pressure in the common header from the first predetermined value.

In some embodiments, steps 502 and 504 are each performed on a periodic basis. For example, the ECU 180 may perform at least steps 502 and 504 of the fifth method 500 in order to check for leaks on a regular basis, such as daily, weekly, etc.

The fifth method 500 also includes monitoring, after gradually adding the fluid to the common header, the fluid pressure in the common header at step 506.

In some embodiments, step 506 includes opening a proportional valve to an intermediate position to allow flow from an air source to the common header. Alternatively or additionally, step 506 may include opening a non-proportional valve for a duty cycle duration in each of a plurality of time periods to allow flow from an air source to the common header.

The fifth method 500 also includes determining a leak in at least one pressure vessel of the plurality of pressure vessels at step 508, based on the fluid pressure in the common header after gradually adding the fluid to the common header. In some embodiments, step 508 includes determining the fluid pressure in the common header settling at a value below the operating pressure of the plurality of pressure vessels.

The fifth method 500 also includes inflating the at least one pressure vessel by adding fluid to the common header at an inflation flow rate substantially higher than the first flow rate at step 510 and in response to determining the leak in the at least one pressure vessel. For example, the ECU 180 may command the intake valve 111 and the output control valve 113 to a full-open position and/or to a full-open duration in response to determining the leak at step 508.

The fifth method 500 also includes activating a diagnostic indicator at step 512 and in response to determining the leak in the at least one pressure vessel at step 508. For example, the ECU 180 may cause an indicator light to be illuminated and/or for a message to be displayed on a display screen, indicating the detected leak.

The fifth method 500 also includes setting a diagnostic trouble code at step 514 and in response to determining the leak in the at least one pressure vessel. For example, the ECU 180 may set a trouble code in memory that can be subsequently read to indicate the detection of the leak.

The fifth method 500 also includes transmitting a message to remote receiver at step 516 and in response to determining the leak in the at least one pressure vessel. For example, the ECU 180 may cause a message to be transmitted to a fleet management system. Such a message may be transmitted via a digital communications network, such as a cellular data network and/or via the internet.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. A method for detecting a leak in a pressure vessel of a system including a plurality of pressure vessels in fluid communication with a common header, said method comprising:
   reducing a fluid pressure in the common header to a first predetermined value below an operating pressure of the plurality of pressure vessels;
   gradually adding fluid to the common header at a first flow rate to increase the fluid pressure in the common header from the first predetermined value;
   monitoring, after gradually adding the fluid to the common header, the fluid pressure in the common header; and
   determining, based on the fluid pressure in the common header after gradually adding the fluid to the common header, a leak in at least one pressure vessel of the plurality of pressure vessels.

2. The method of claim 1, wherein the plurality of pressure vessels include tires installed on a vehicle.

3. The method of claim 1, wherein the common header is in fluid communication with each of the plurality of pressure vessels via a wheel-end check valve configured to allow fluid flow from the common header to a corresponding one of the plurality of pressure vessels while blocking fluid flow in an opposite direction.

4. The method of claim 1, wherein determining the leak in the at least one pressure vessel includes determining the fluid pressure in the common header settling at a value below the operating pressure of the plurality of pressure vessels.

5. The method of claim 1, wherein reducing the fluid pressure in the common header and gradually adding the fluid to the common header are each performed on a periodic basis.

6. The method of claim 1, wherein reducing the fluid pressure in the common header includes opening an exhaust valve to release fluid from the common header.

7. The method of claim 1, wherein reducing the fluid pressure in the common header includes fluid leaking from the common header with no controlled valves in fluid communication with the common header being commanded open.

8. The method of claim 1, wherein gradually adding fluid to the common header includes opening a proportional valve to an intermediate position to allow flow from an air source to the common header.

9. The method of claim 1, wherein gradually adding fluid to the common header includes opening a non-proportional valve for a duty cycle duration in each of a plurality of time periods to allow flow from an air source to the common header.

10. The method of claim 1, further comprising: inflating the at least one pressure vessel in response to determining the leak in the at least one pressure vessel by adding fluid to the common header at an inflation flow rate substantially higher than the first flow rate.

11. The method of claim 1, further comprising: activating a diagnostic indicator in response to determining the leak in the at least one pressure vessel.

12. The method of claim 1, further comprising: setting a diagnostic trouble code in response to determining the leak in the at least one pressure vessel.

13. The method of claim 1, further comprising: transmitting a message to remote receiver in response to determining the leak in the at least one pressure vessel.

14. A system for managing pressure in a plurality of tires of a vehicle, comprising:
- a manifold defining a channel and configured to distribute compressed air from a compressed air source;
- a common header providing fluid communication between the manifold and each of the plurality of tires;
- a control valve configured to control air flow from the compressed air source to the common header;
- a pressure sensor configured to monitor a pressure in the common header; and
- an electronic control unit in functional communication with the control valve and the pressure sensor, the electronic control unit configured to:
  - reduce a fluid pressure in the common header to a first predetermined value below an operating pressure of the plurality of tires;
  - gradually add air to the common header to increase the fluid pressure in the common header from the first predetermined value;
  - monitor, after gradually adding the fluid to the common header, the fluid pressure in the common header; and
  - determine, based on the fluid pressure in the common header after gradually adding the air to the common header, a leak in at least one of the plurality of tires.

15. The system of claim 14, wherein the common header is in fluid communication with each of the plurality of tires via a wheel-end check valve configured to allow fluid flow from the common header to a corresponding one of the tires while blocking fluid flow in an opposite direction.

16. The system of claim 14, wherein determining the leak in the at least one of the plurality of tires includes electronic control unit determining the fluid pressure in the common header settling at a value below the operating pressure of the tires.

17. The system of claim 14, wherein the electronic control unit is configured to reduce the fluid pressure in the common header and to gradually add the fluid to the common header on a periodic basis.

18. The system of claim 14, further comprising an exhaust valve configured to control air flow from the channel to an exhaust port, and
wherein reducing the fluid pressure in the common header includes the electronic control commanding the exhaust valve to open.

19. The system of claim 14, wherein gradually adding fluid to the common header includes opening a proportional valve to an intermediate position to allow flow from the compressed air source to the common header.

20. The system of claim 14, wherein gradually adding fluid to the common header includes opening a non-proportional valve for a duty cycle duration in each of a plurality of time periods to allow flow from the compressed air source to the common header.

* * * * *